United States Patent
Iura et al.

(10) Patent No.: US 10,356,613 B2
(45) Date of Patent: Jul. 16, 2019

(54) INFORMATION PROCESSING DEVICE AND INFORMATION PROCESSING SYSTEM THAT EXECUTES A PROCESS BASED ON A USER OPERATION RECEIVED FROM AN OPERATOR

(71) Applicants: Saori Iura, Kanagawa (JP); Susumu Fujioka, Kanagawa (JP)

(72) Inventors: Saori Iura, Kanagawa (JP); Susumu Fujioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 40 days.

(21) Appl. No.: 15/053,325

(22) Filed: Feb. 25, 2016

(65) Prior Publication Data

US 2016/0254845 A1    Sep. 1, 2016

(30) Foreign Application Priority Data

Feb. 27, 2015   (JP) ................................ 2015-039047
Jan. 28, 2016   (JP) ................................ 2016-014117

(51) Int. Cl.
*H04W 4/80*      (2018.01)
*H04W 12/06*     (2009.01)
*G06F 3/0488*    (2013.01)

(52) U.S. Cl.
CPC .......... *H04W 12/06* (2013.01); *G06F 3/0488* (2013.01); *H04W 4/80* (2018.02)

(58) Field of Classification Search
CPC ... H04W 12/06; H04W 76/023; H04W 4/008; H04W 84/18; H04W 8/005; H04W 12/08;

(Continued)

(56) References Cited

U.S. PATENT DOCUMENTS 7,860,424 B2   12/2010   Iura et al.
8,305,629 B2   11/2012   Iura et al.
(Continued)

FOREIGN PATENT DOCUMENTS

| JP | 2003-208435 | 7/2003 |
| JP | 2008-510216 | 4/2008 |
| JP | 2013-065125 | 4/2013 |

*Primary Examiner* — Golam Sorowar
(74) *Attorney, Agent, or Firm* — Oblon, McClelland, Maier & Neustadt, L.L.P.

(57) ABSTRACT

An information processing device executes a process based on a command received from an operator. The information processing device includes a receiver to receive radio waves output from mobile terminals; a retrieval unit to retrieve, from each of the radio waves, an operator identification information item for identifying an operator carrying the mobile terminal; a measurement unit to measure a radio wave strength level of each of the radio waves received by the receiver; a first storage unit to store, for each operator identification information item retrieved by the retrieval unit, the radio wave strength level measured by the measurement unit; an identifying unit to identify, based on the radio wave strength levels stored for the corresponding operator identification information items, the operator identification information item output by the mobile terminal carried by the operator; and a controller to control execution of the process requested by the operator.

16 Claims, 31 Drawing Sheets

(58) Field of Classification Search
CPC ... H04W 12/12; H04W 40/246; H04W 4/021; H04W 4/04; H04W 4/043; H04W 4/16; H04W 84/12; G06F 3/1423; G06F 3/1454; G06F 3/005; G06F 1/1626; G06F 2200/1614; G06F 2203/04803; G06F 2203/04808; G06F 3/03; G06F 3/0346; G06F 3/0482; G06F 3/04847; G06F 3/0488; G06F 3/04883; G06F 3/04886; G06F 3/14; G06F 9/4445; G09G 2370/16; G09G 2340/045; G09G 2340/0464; G09G 2356/00; G09G 2340/0492; G09G 2370/022; G09G 3/2092; G09G 5/00; G09G 5/12

See application file for complete search history.

(56) References Cited

U.S. PATENT DOCUMENTS

| | | |
|---|---|---|
| 8,363,285 B2 | 1/2013 | Iura et al. |
| 8,810,840 B2 | 8/2014 | Iura et al. |
| 2008/0109895 A1 | 5/2008 | Janevski |
| 2008/0259393 A1 | 10/2008 | Iura et al. |
| 2011/0007353 A1 | 1/2011 | Iura et al. |
| 2012/0038678 A1* | 2/2012 | Hwang ................ G06F 3/1454 345/667 |
| 2012/0254247 A1* | 10/2012 | Sakamoto ............ G06Q 10/06 707/784 |
| 2014/0104443 A1* | 4/2014 | Takahashi .......... H04N 1/00347 348/207.1 |
| 2014/0184923 A1* | 7/2014 | Abe .................... H04N 5/4403 348/734 |
| 2015/0138077 A1* | 5/2015 | Yamaji ................ G06F 3/0488 345/156 |

* cited by examiner

FIG.8A

| OUTPUT TERMINAL IDENTIFICATION INFORMATION ~801 | OPERATOR IDENTIFICATION INFORMATION ~802 |
|---|---|
| ID0001 | USER A |
| ID0002 | USER B |
| ID0003 | USER C |
| ID0004 | USER D |

FIG.8B

| OUTPUT TERMINAL IDENTIFICATION INFORMATION ~801 | RADIO WAVE STRENGTH [dBm] ~803 |
|---|---|
| ID0001 | −41 |
| ID0002 | −60 |
| ID0003 | ----- |
| ID0004 | −75 |

FIG.8C

| OUTPUT TERMINAL IDENTIFICATION INFORMATION 801 | OPERATOR IDENTIFICATION INFORMATION 802 | RADIO WAVE STRENGTH [dBm] 803 | OPERATOR INFORMATION (◎: CURRENT OPERATOR) 804 |
|---|---|---|---|
| ID0001 | USER A | -41 | ◎ |
| ID0002 | USER B | -60 | |
| ID0003 | USER C | ---- | |
| ID0004 | USER D | -75 | |

FIG.10

| DATE AND TIME OF WRITING | IMAGE DATA | OPERATOR IDENTIFICATION INFORMATION |
|---|---|---|
| yyyy/mm/dd hh:mm:ss | POSITION: (X1,Y1), (X2,Y2), ⋯, (Xn,Yn)  * n IS ANY NATURAL NUMBER<br>COLOR: (R,G,B)=(128,128,0) | USER A |
| yyyy/mm/dd hh:mm:ss | POSITION: (X1,Y1), (X2,Y2), ⋯, (Xn,Yn)  * n IS ANY NATURAL NUMBER<br>COLOR: (R,G,B)=(128,128,255) | USER B |
| yyyy/mm/dd hh:mm:ss | POSITION: (X1,Y1), (X2,Y2), ⋯, (Xn,Yn)  * n IS ANY NATURAL NUMBER<br>COLOR: (R,G,B)=(0,128,0) | USER D |
| yyyy/mm/dd hh:mm:ss | POSITION: (X1,Y1), (X2,Y2), ⋯, (Xn,Yn)  * n IS ANY NATURAL NUMBER<br>COLOR: (R,G,B)=(64,128,128) | USER A |

FIG.12
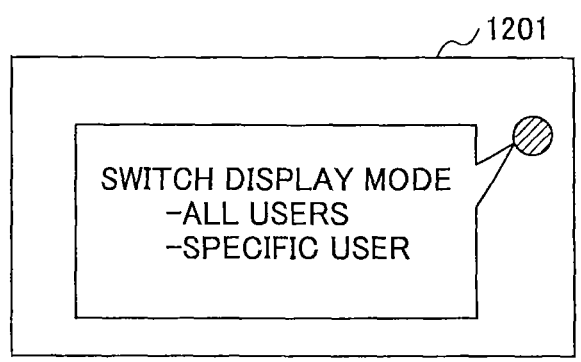
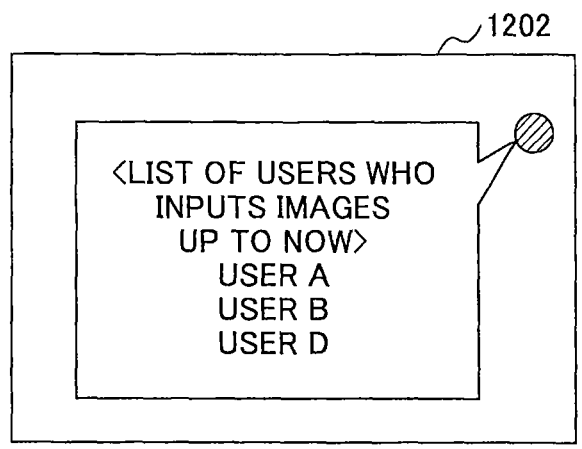

FIG.13
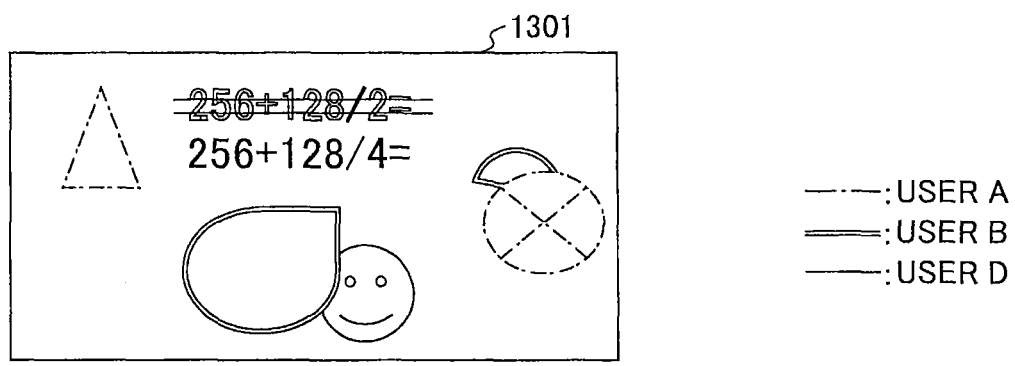
—·—: USER A
═══: USER B
———: USER D
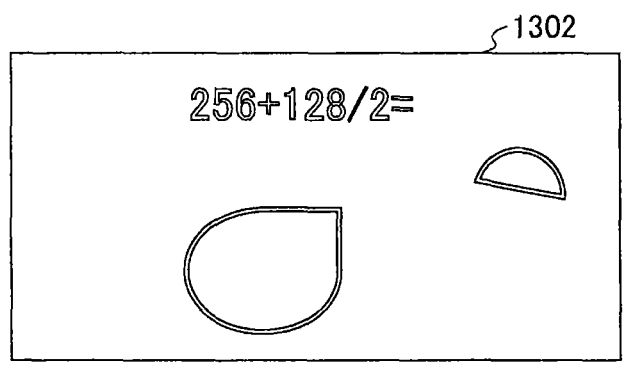

FIG.16A

| OUTPUT TERMINAL IDENTIFICATION INFORMATION /801 | OPERATOR IDENTIFICATION INFORMATION /802 | MAXIMUM RADIO WAVE STRENGTH [dBm] /1601 |
|---|---|---|
| ID0001 | USER A | -39 |
| ID0002 | USER B | -41 |
| ID0003 | USER C | -44 |
| ID0004 | USER D | -37 |

FIG.16B

| OUTPUT TERMINAL IDENTIFICATION INFORMATION /801 | OPERATOR IDENTIFICATION INFORMATION /802 | MAXIMUM RADIO WAVE STRENGTH [dBm] /1601 | RADIO WAVE STRENGTH [dBm] /803 | OPERATOR INFORMATION (◎: CURRENT OPERATOR) /804 |
|---|---|---|---|---|
| ID0001 | USER A | -39 | -40 | |
| ID0002 | USER B | -41 | -41 | ◎ |
| ID0003 | USER C | -44 | ---- | |
| ID0004 | USER D | -37 | -75 | |

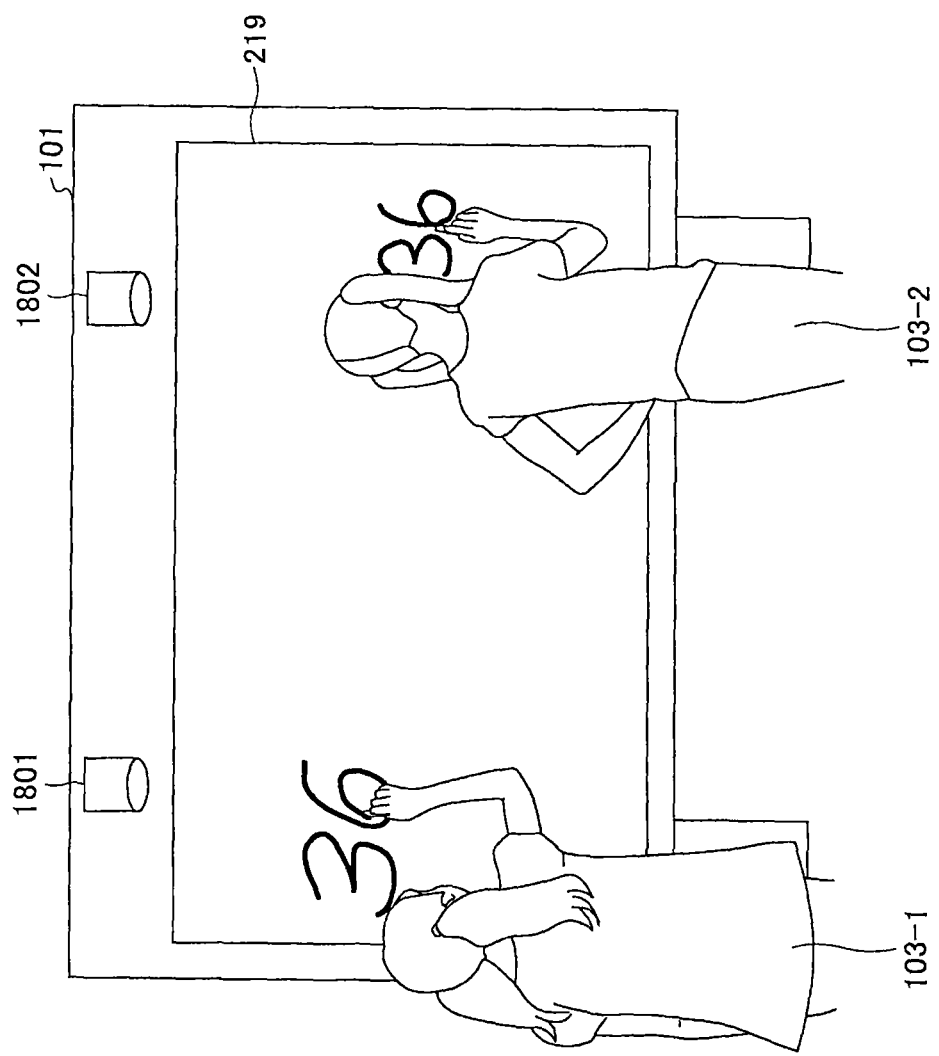

FIG.26A

| OUTPUT TERMINAL IDENTIFICATION INFORMATION | OPERATOR IDENTIFICATION INFORMATION | FIRST RADIO WAVE STRENGTH [mW] | SECOND RADIO WAVE STRENGTH [mW] |
|---|---|---|---|
| aaa | USER A | 2.5 | 1.2 |
| bbb | USER B | 2.1 | 0.8 |
| ccc | USER C | 2.3 | 1 |
| ddd | USER D | 2.1 | 0.8 |

FIG.26B

| OUTPUT TERMINAL IDENTIFICATION INFORMATION | OPERATOR IDENTIFICATION INFORMATION | RECEIVED RADIO WAVE STRENGTH [mW] | STATUS OF ADVANCE AUTHENTICATION PROCESS |
|---|---|---|---|
| aaa | USER A | 1.2 | EXECUTED |
| bbb | USER B | 0.5 | NOT EXECUTED |
| ccc | USER C | 0 | NOT EXECUTED |
| ddd | USER D | 1 | EXECUTED |

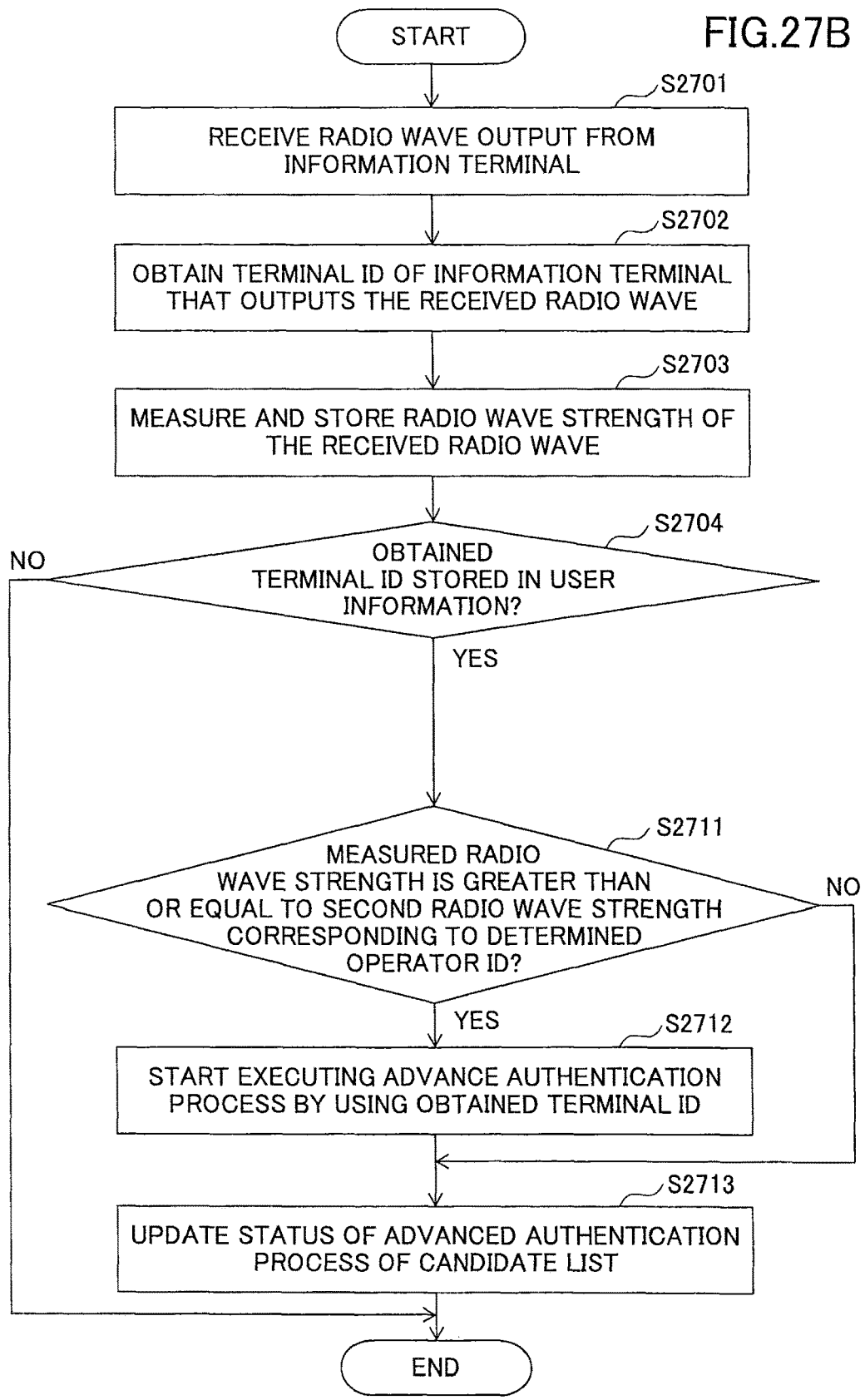

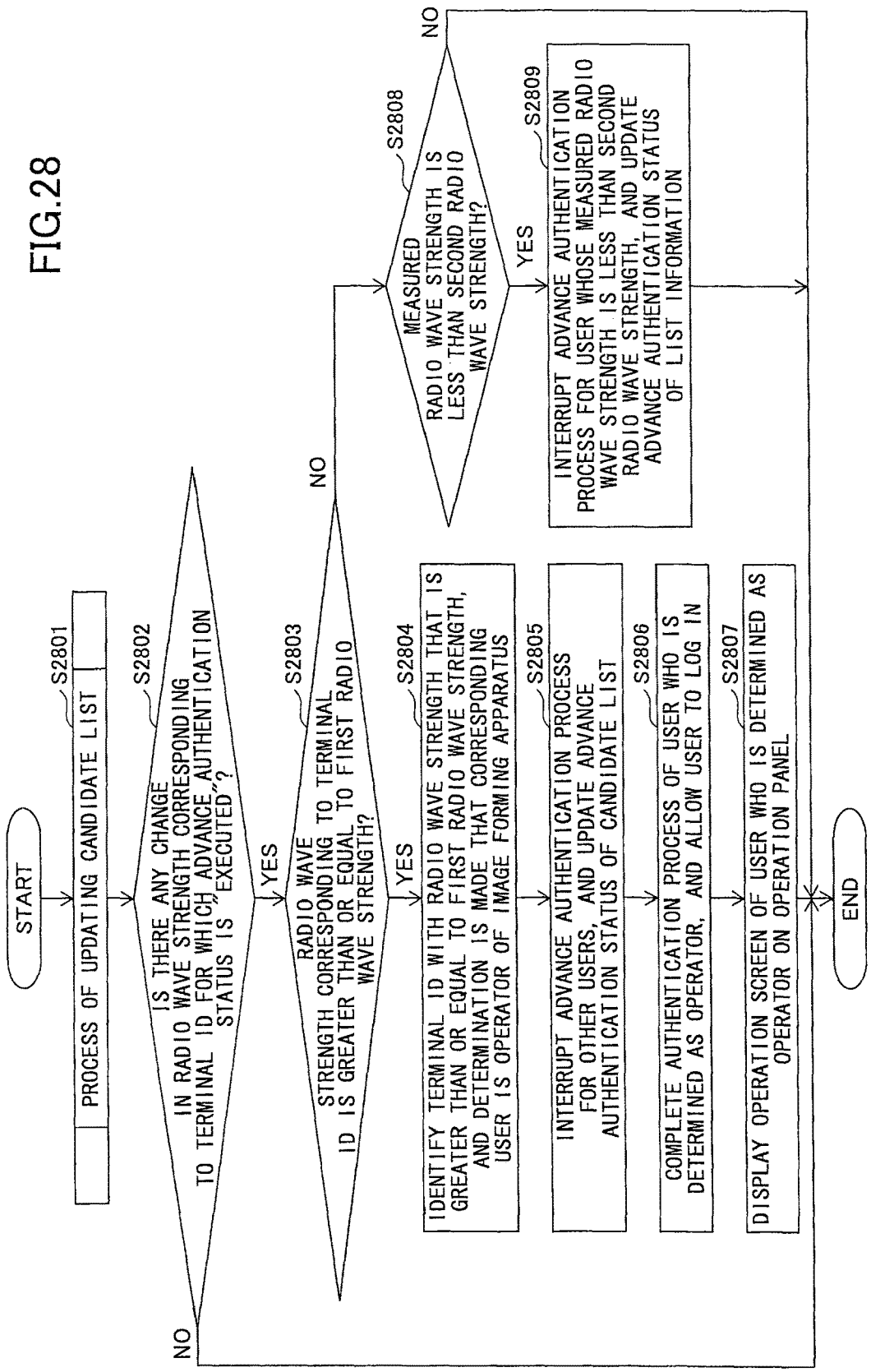

INFORMATION PROCESSING DEVICE AND INFORMATION PROCESSING SYSTEM THAT EXECUTES A PROCESS BASED ON A USER OPERATION RECEIVED FROM AN OPERATOR

BACKGROUND OF THE INVENTION

1. Field of the Invention

The present invention relates to an information processing device, and an information processing system.

2. Description of the Related Art

An interactive whiteboard has been known to which handwritten image data can be input, while the interactive whiteboard is displaying materials, for example. The interactive whiteboard may be formed, for example, by installing a touch panel in a flat panel display, such as a liquid-crystal display, or in a projection screen of a projector.

A technique has been known such that, in a similar system, in response to detecting that a participant of a conference holds a stylus pen, the stylus pen obtains, as information on a person who draws an image, personal information from a participant's IC card by using contactless communication (c.f., Patent Document 1 (Japanese Unexamined Patent Publication No. 2003-208435)).

SUMMARY OF THE INVENTION

According to the technique that is described in Patent Document 1, a person who inputs image data to the interactive whiteboard can be identified where a dedicated stylus pen approaches the IC card owned by the person. However, an image can be input to the interactive whiteboard by using an object other than the dedicated stylus pen (e.g., a finger). If an image can be input to the interactive whiteboard without using the stylus pen, it may be difficult to identify the person who inputs the image. In addition, even if an image is input by using a stylus pen, if the user of the stylus pen forgets to bring the stylus pen near the user's IC card, for example, it may be difficult to identify the person who inputs the image. In this manner, according to the known techniques, it may be difficult to identify the user who inputs image data in an information processing device (an image processing device), such as the interactive whiteboard, to which image data can be input by a plurality of users.

It may be difficult to identify the user who inputs image data, not only for an interactive whiteboard to which image data can be input, but also in various types of information processing devices that identify a user who inputs a command, and that execute a process requested by the identified user (e.g., an image forming device that can be shared by a plurality of users).

There is a need to facilitate, in an information processing device that can execute a process based on a command received from an operator, a process of associating the user who inputs a command to the information processing device, and execution of the process requested by the identified user.

According to an aspect of the present invention, there is provided an information processing device configured to execute a process based on a command received from an operator. The information processing device includes a receiver configured to receive radio waves output from one or more mobile terminals; a retrieval unit configured to retrieve, from each of the radio waves received by the receiver, an operator identification information item for identifying an operator carrying the mobile terminal that outputs the radio wave; a measurement unit configured to measure a radio wave strength level of each of the radio waves received by the receiver; a first storage unit configured to store, for each operator identification information item retrieved by the retrieval unit, the radio wave strength level measured by the measurement unit; an identifying unit configured to identify, based on the radio wave strength levels stored for the corresponding operator identification information items, the operator identification information item output by the mobile terminal carried by the operator who inputs the command to the information processing device; and a controller configured to control execution of the process requested by the operator identified by the identified operator identification information item.

According to another embodiment, there is provided an information processing device configured to receive an instruction at a position on an input surface from a plurality of operators holding corresponding mobile terminals, and configured to display an indication of the instruction. The information processing device includes a detector configured to detect the position of the instruction on the input surface, the instruction being received from the operator; a receiver configured to receive radio waves output from the mobile terminals held by the plurality of operators; a retrieval unit configured to retrieve, from each of the radio waves received by the receiver, an output terminal identification information item for identifying the mobile terminal that outputs the radio wave; an identification information storage unit configured to store operator identification information items for identifying the corresponding operators of the plurality of operators, and the output terminal identification information items, while associating the operator identification information items with the output terminal identification information items; a measurement unit configured to measure a strength level of each of the radio waves received by the receiver; an identifying unit configured to identify, based on the strength levels of the radio waves measured by the measurement unit and the output terminal identification information items, the output terminal identification information item of the radio wave that is output from the mobile terminal held by the operator who inputs the instruction for which the position is detected by the detector; an instruction storage unit configured to store the operator identification information item that is associated with the output terminal identification information item identified by the identifying unit, the operator identification information item being associated with the output terminal identification information item by the identification information storage unit, and the instruction position information indicating the position of the instruction detected by the detector, while associating the operator identification information item with the instruction position information; and a display unit configured to display the indication of the instruction corresponding to the instruction position information that is stored by the instruction storage unit, so that the operator who inputs the instruction is identified based on the operator identification information item that is associated with the instruction position information in the instruction storage unit.

According to another embodiment, there is provided a non-transitory storage medium storing a program that causes an information processing device, the information processing device being configured to execute a process based on an instruction received from an operator, to function as a receiver configured to receive radio waves output from one or more mobile terminals; a retrieval unit configured to retrieve, from each of the radio waves received by the receiver, an operator identification information item for identifying an operator carrying the mobile terminal that outputs the radio wave; a measurement unit configured to measure a radio wave strength level of each of the radio waves received by the receiver; a first storage unit configured to store, for each operator identification information item retrieved by the retrieval unit, the radio wave strength level measured by the measurement unit; an identifying unit configured to identify, based on the radio wave strength levels stored for the corresponding operator identification information items, the operator identification information item output by the mobile terminal carried by the operator who inputs the command to the information processing device; and a controller configured to control execution of the process requested the operator identified by the identified operator identification information item.

According to another embodiment, there is provided a non-transitory storage medium storing a program that causes an information processing device, the information processing device being configured to receive an instruction at a position on an input surface from a plurality of operators holding corresponding mobile terminals, and configured to display an indication of the instruction, to function as a detector configured to detect the position of the instruction on the input surface, the instruction being received from the operator; a receiver configured to receive radio waves output from the mobile terminals held by the plurality of operators; a retrieval unit configured to retrieve, from each of the radio waves received by the receiver, an output terminal identification information item for identifying the mobile terminal that outputs the radio wave; an identification information storage unit configured to store operator identification information items for identifying the corresponding operators of the plurality of operators, and the output terminal identification information items, while associating the operator identification information items with the output terminal identification information items; a measurement unit configured to measure a strength level of each of the radio waves received by the receiver; an identifying unit configured to identify, based on the strength levels of the corresponding radio waves measured by the measurement unit and the output terminal identification information items, the output terminal identification information item of the radio wave that is output from the mobile terminal held by the operator who inputs the instruction for which the position is detected by the detector; an instruction storage unit configured to store the operator identification information item that is associated with the output terminal identification information item identified by the identifying unit, the operator identification information item being associated with the output terminal identification information item by the identification information storage unit, and the instruction position information indicating the position of the instruction detected by the detector, while associating the operator identification information item with the instruction position information; and a display unit configured to display the indication of the instruction corresponding to the instruction position information that is stored by the instruction storage unit, so that the operator who inputs the instruction is identified based on the operator identification information item that is associated with the instruction position information in the instruction storage unit.

According to another embodiment, there is provided an information processing system configured to execute a process based on a command received from an operator. The information processing system includes a receiver configured to receive radio waves output from one or more mobile terminals; a retrieval unit configured to retrieve, from each of the radio waves received by the receiver, an operator identification information item for identifying an operator carrying the mobile terminal that outputs the radio wave; a measurement unit configured to measure a radio wave strength level of each of the radio waves received by the receiver; a first storage unit configured to store, for each operator identification information item retrieved by the retrieval unit, the radio wave strength level measured by the measurement unit; an identifying unit configured to identify, based on the radio wave strength levels stored for the corresponding operator identification information items, the operator identification information item output by the mobile terminal carried by the operator who inputs the command to the information processing system; and a controller configured to control execution of the process requested by the operator identified by the identified operator identification information item.

According to another embodiment, there is provided an information processing system configured to receive an instruction at a position on an input surface from a plurality of operators holding corresponding mobile terminals, and configured to display an indication of the instruction. The information processing system includes a detector configured to detect the position of the instruction on the input surface, the instruction being received from the operator; a receiver configured to receive radio waves output from the mobile terminals held by the plurality of operators; a retrieval unit configured to retrieve, from each of the radio waves received by the receiver, an output terminal identification information item for identifying the mobile terminal that outputs the radio wave; an identification information storage unit configured to store operator identification information items for identifying the corresponding operators of the plurality of operators, and the output terminal identification information items, while associating the operator identification information items with the output terminal identification information items; a measurement unit configured to measure a strength level of each of the radio waves received by the receiver; an identifying unit configured to identify, based on the strength levels of the radio waves measured by the measurement unit and the output terminal identification information items, the output terminal identification information item of the radio wave that is output from the mobile terminal held by the operator who inputs the instruction for which the position is detected by the detector; an instruction storage unit configured to store the operator identification information item that is associated with the output terminal identification information item identified by the identifying unit, the operator identification information item being associated with the output terminal identification information item by the identification information storage unit, and the instruction position information indicating the position of the instruction detected by the detector, while associating the operator identification information item with the instruction position information; and a display unit configured to display the indication of the instruction corresponding to the instruction position information that is stored by the instruction storage unit, so that the operator who inputs the instruction is identified based on the operator identification information item that is associated with the instruction position information in the instruction storage unit.

According to an embodiment of the present invention, in an information processing device that can execute a process based on a command received from an operator, a process of identifying a user who inputs a command to the information processing device and execution of a process corresponding to the identified user can be facilitated.

Other objects, features and advantages of the present invention will become more apparent from the following detailed description when read in conjunction with the accompanying drawings.

BRIEF DESCRIPTION OF THE DRAWINGS

FIGS. 8A-8C are diagrams illustrating an example of information used in the embodiment;

FIG. 10 is a diagram illustrating an example of the image data according to the embodiment;

FIG. 12 is a diagram illustrating an example of a display selection screen according to the embodiment;

FIG. 13 is a diagram illustrating an example of a display screen according to the embodiment;

FIGS. 16A and 16B are diagrams illustrating an example of information used in the other embodiment;

FIG. 17 is a diagram illustrating an example of the system configuration of the image processing system according to another embodiment;

FIGS. 26A and 26B are diagrams illustrating an example of information used in the further embodiment;

FIGS. 27A and 27B are flowcharts illustrating examples of a process of updating a candidate list according to the further embodiment;

FIG. 28 is a flowchart illustrating an example of a process of determining the operator according to the further embodiment.

DETAILED DESCRIPTION OF THE PREFERRED EMBODIMENTS

Embodiments of the present invention are described below by referring to the accompanying drawings.

<System Configuration>

Figure 1:
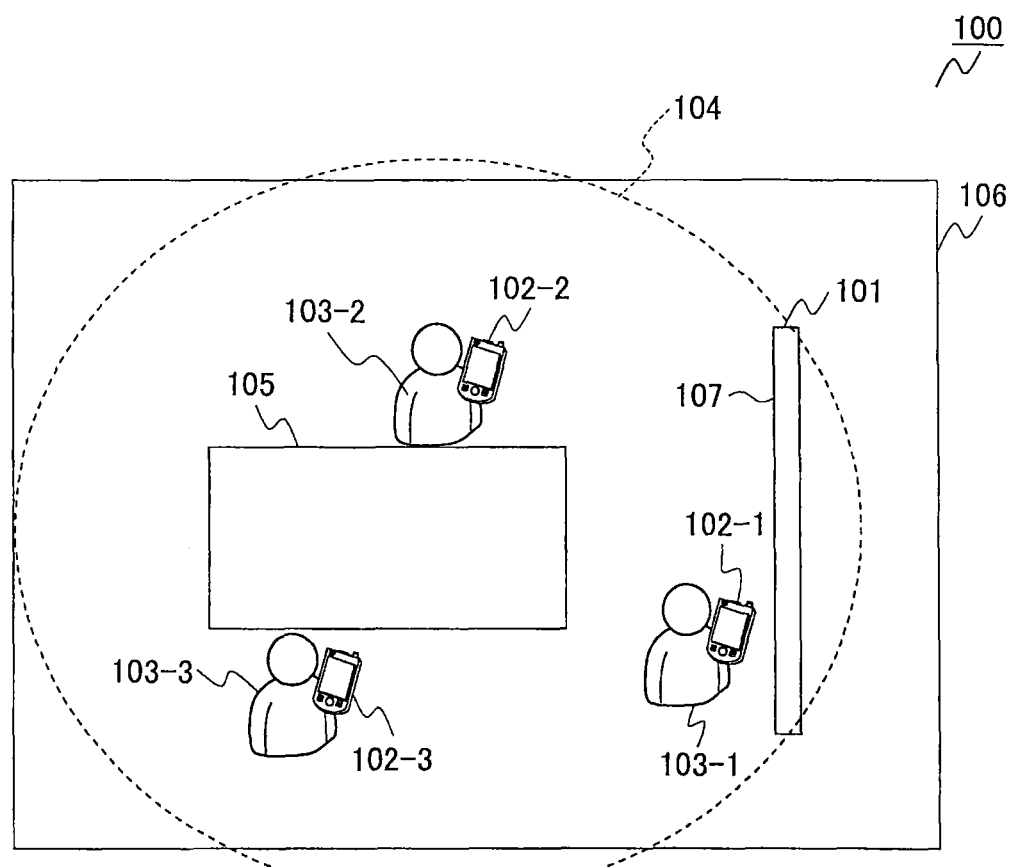
FIG. 1 is a diagram illustrating an example of a configuration of an image processing system according to an embodiment.

FIG. 1 is a diagram illustrating an example of a configuration of an image processing system 100 according to an embodiment. The image processing system 100 may include an interactive whiteboard 101; and information terminals 102-1 to 102-3 used by a plurality of users 103-1 to 103-3. In the example of FIG. 1, it is assumed that the interactive whiteboard 101 and a conference table 105 are arranged in a conference room 106; and that the plurality of users 103-1 to 103-3 is conducting a conference by using the interactive whiteboard 101. Note that the image processing system 100 is an example of an information processing system.

Here, the number of the users 103-1 to 103-3 and the number of the information terminals 102-1 to 102-3 are for exemplifying purposes only. The number of the users 103-1 to 103-3 may be more than three or less than three, and the number of the information terminals 102-1 to 102-3 may be more than three or less than three. In the following description, for indicating any information terminal of the plurality of information terminals 102-1 to 102-3, the notation "information terminal 102" may be used.

The interactive whiteboard 101 is an image processing device that can be formed by installing a touch panel in a flat panel display, such as a liquid crystal display, or in a projection screen of a projector, for example. While the interactive whiteboard 101 is displaying materials, handwritten image data can be input to the interactive whiteboard 101. Note that, in the example of FIG. 1, it is assumed that an input surface 107 for writing on the interactive whiteboard 101 (for inputting an image) faces the direction from toward the conference table 105.

The information terminal 102 can be a smart device, such as a smartphone, a tablet terminal, a smart watch, smart glass, and so forth. It is assumed that each of the plurality of users 103-1 to 103-3 holds (carries) his or her own information terminal 102.

Each of the interactive whiteboard 101 and the information terminal 102 according to the embodiment includes a short range wireless communication device, such as a device based on Bluetooth (registered trademark) Low Energy (which is referred to as the BLE, hereinafter). The interactive whiteboard 101 receives, from each of the plurality of information terminals 102-1 to 102-3 located within a communication range 104 of the short range communication device of the interactive whiteboard 101, predetermined information (e.g., identification information of the information terminal 102, and information on the user of the information terminal 102) by the short range wireless communication. The interactive whiteboard 101 measures strength of a received signal that is received from each of the plurality of information terminals 102-1 to 102-3.

With the above-described configuration, the interactive whiteboard 101 identifies, in response to detecting that image data is written on the input surface 107 of the interactive whiteboard 101, a user who writes the image data, based on the measured strength of the received signal of the information terminal 102, and the received predetermined information of the information terminal 102. For example, the interactive whiteboard 101 compares the strength of the received signals that are received from the plurality of the information terminals 102-1 to 102-3, respectively; and the interactive whiteboard 101 determines that the information terminal 102-1 with the strongest received signal is the information terminal 102 of the user who writes the image data. Additionally, the interactive whiteboard 101 identifies the user 103-1 who writes the image data, based on recorded information that defines the correspondence between the identification information of the information terminal 102 and the information on the user of the information terminal 102, for example.

In this manner, with the interactive whiteboard 101 according to the embodiment, a user who inputs image data can be identified, independently of a predetermined stylus pen, for example, and without performing a special operation during input of the image data. Thus, according to the embodiment, in an image processing device (the interactive whiteboard 101) to which a plurality of user can input image data, identification of a user who inputs image data is facilitated.

Note that, in the example of FIG. 1, the communication range 104 of the short range wireless communication device of the interactive whiteboard 101 is mainly formed, by a directional characteristic of antennas, for example, in front of the input surface 107 of the interactive whiteboard 101 (in the direction toward the conference table 105). It can be considered, in general that users of the interactive whiteboard 101 are located in an area in front of the input surface 107 of the interactive whiteboard 101. Furthermore, it is difficult to write on the input surface 107 of the interactive whiteboard 101 from the side of the interactive white board 101, or from behind the interactive white board 101.

Thus, as depicted in FIG. 1, by mainly forming the communication range 104 in front of the input surface 107 of the interactive whiteboard 101, likelihood of erroneously detecting the information terminal 102 of a user who does not participate in the conference, or the information terminal 102 of a user who is located to the side or behind the interactive whiteboard 101 can be reduced.

Note that the system configuration of FIG. 1 is for exemplifying purposes only, and the embodiment of the present invention is not limited to the system configuration of FIG. 1. For example, the communication range 104 of the short range wireless communication device of the interactive whiteboard 101 may be formed at an area other than the area in front of the input surface 107 of the interactive whiteboard 101. The interactive whiteboard 101 is an example of an image processing device. The interactive whiteboard 101 may be implemented by a personal computer (PC) that includes a built-in touch panel display, a PC that includes an external touch panel display, or a large tablet terminal, for example.

<Hardware Configuration>
(Hardware Configuration of the Interactive Whiteboard)

Figure 2:
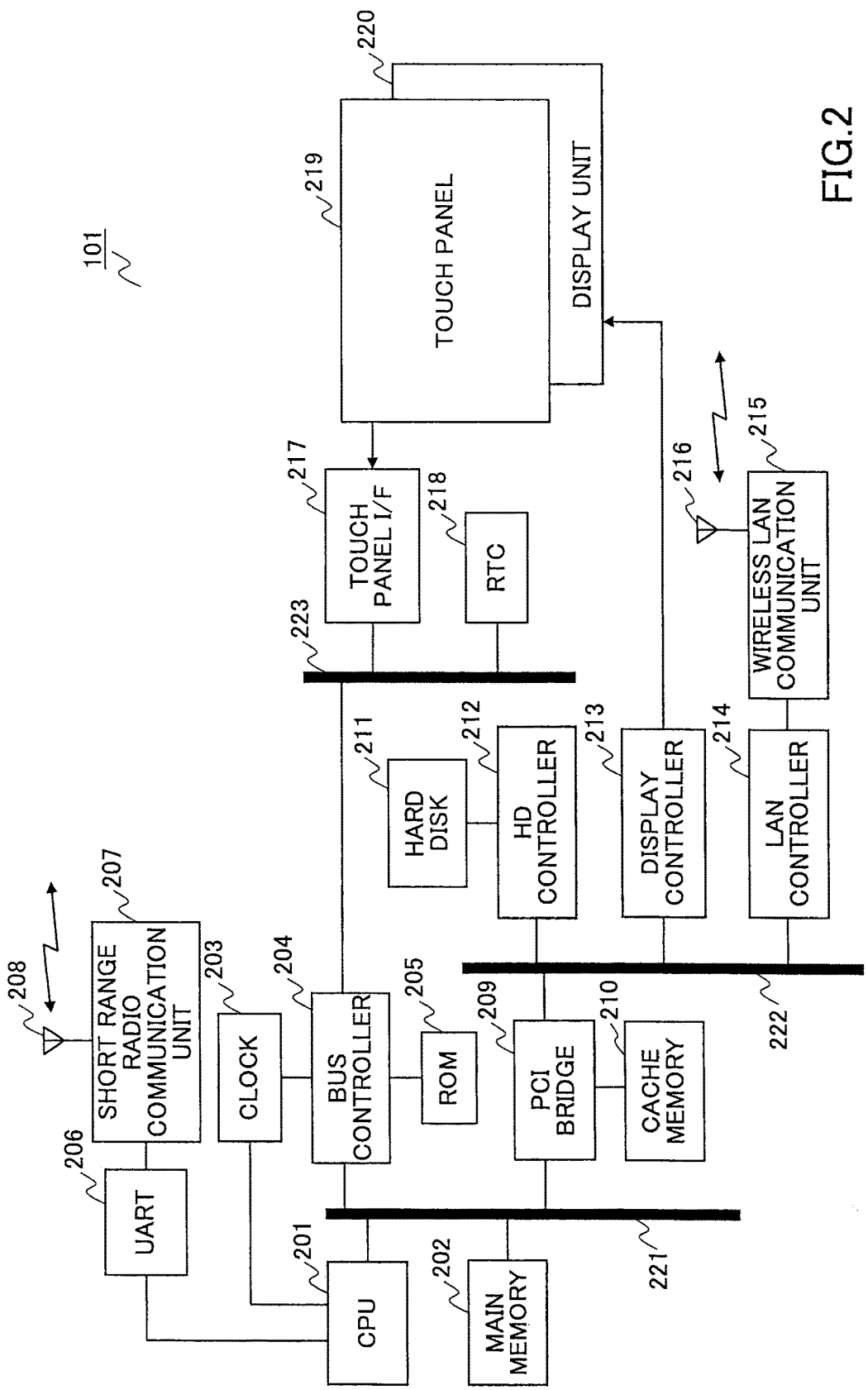
FIG. 2 is a diagram illustrating an example of a hardware configuration of an interactive whiteboard according to the embodiment.

FIG. 2 is a diagram illustrating an example of a hardware configuration of the interactive whiteboard 101 according to the embodiment. Here, the hardware configuration of the interactive whiteboard 101, as an example of the image processing device according to the embodiment, is described.

For example, the interactive whiteboard 101 may include a central processing unit (CPU) 201; a main memory 202; a clock 203; a bus controller 204; a read only memory (ROM) 205; a universal asynchronous receiver transmitter (UART) 206; a short range radio communication unit 207; a first antenna 208; a peripheral component interconnect (PCI) bridge 209; a cache memory 210; a hard disk 211; a hard disk (HD) controller 212; a display controller 213; a LAN controller 214; a wireless LAN communication unit 215; a second antenna 216; a touch panel interface (I/F) 217; a RTC 218; a touch panel 219; a display unit 220; a CPU bus 221; a PCI bus 222; an X bus (internal bus) 223, and so forth.

The CPU 201 executes and processes a control program stored in the ROM 205, an operating system (OS) that is read out from the hard disk 211 and that is written in the main memory 202, and various types of application programs, for example. The main memory 202 is a volatile memory, such as a dynamic random access memory (DRAM), which can be used as a work area of the CPU 201, for example. The clock 203 includes, for example, a quartz oscillator, and a clock division circuit. The clock 203 generates clocks to control operation timing of the CPU 201 and the bus controller 204.

The bus controller 204 controls data transfer between the CPU bus 221 and the X bus 223. The ROM 205 is a non-volatile memory in which programs are pre-registered, such as a program to boot the system upon detecting that the power supply of the system is turned on, and a program to control various types of devices.

The UART 206 is an interface unit to connect a serial interface of the short range wireless communication unit 207 to a parallel interface of the CPU 201. The short range wireless communication unit 207 is a radio communication unit to execute short range wireless communication, such as short range wireless communication based on Bluetooth, or based on the BLE, with the interactive whiteboard 101 through the first antenna 208.

The PCI bridge 209 executes, by using the cache memory 210, data transfer between the PCI bus 222 and the CPU 201. The cache memory 210 is formed of the DRAM, for example. The cache memory 210 can be used by the PCI bridge 209.

The hard disk 211 is a storage device to store system software; various types of application programs; data that is saved by a user, and so forth. The HD controller 212 includes, as an interface with the hard disk 211, an integrated device electronics (IDE) interface, for example. The HD controller 121 executes high-speed data transfer with the hard disk 211.

The display controller 213 applies digital-to-analog (D/A) conversion to text data and graphic data; and the display controller 213 controls the display unit 220 to display the data. The LAN controller 214 controls, by executing a communication protocol that conforms to the IEEE 802.11 standard, for example, data communication with another communication device. Here, the other communication device is connected to the interactive whiteboard 101 by a wireless LAN through the wireless LAN communication unit 215 and the second antenna 216. The display unit 220 is a display with a large screen. For example, a liquid crystal display (LCD) can be used as the display unit 220.

The touch panel I/F 217 includes a port for the touch panel 219. The touch panel I/F 217 is controlled by a touch panel driver (a control program). The RTC 218 is a real-time clock, and the RTC 218 is backed up by a battery (not depicted).

In the touch panel 219, for example, a plurality of infrared light emitting diodes (LEDs) is disposed at equal intervals on an edge, and a plurality of phototransistors is disposed at equal intervals on another edge that faces the edge on which the plurality of the infrared LEDs is disposed. In the touch panel 219, an area at which the phototransistors do not detect light, namely, the area where the light is blocked is determined to be a touched position on the touch panel 219.

Figure 3:
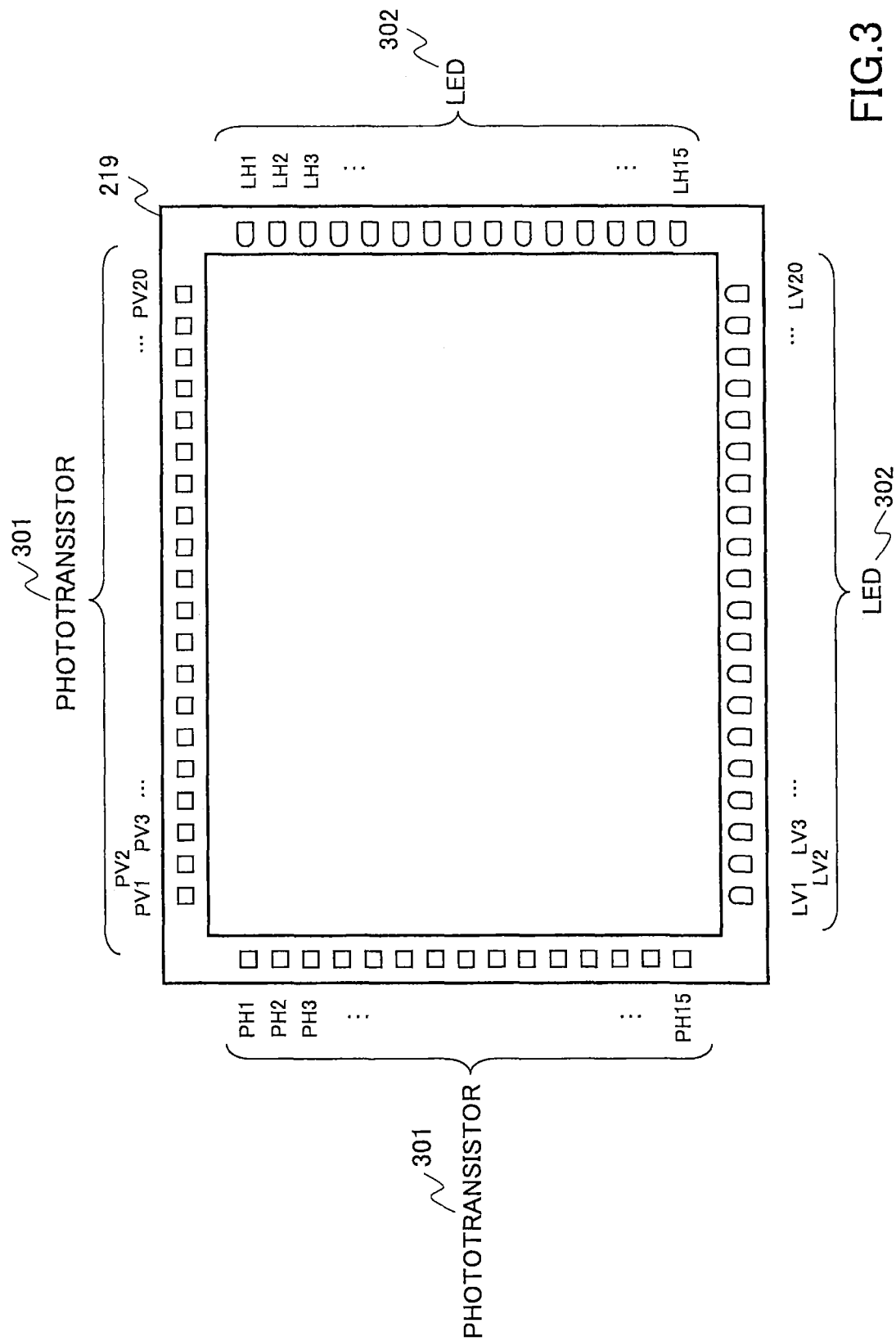
FIG. 3 is a diagram illustrating an example of a hardware configuration of a touch panel of the interactive whiteboard according to the embodiment.

FIG. 3 is a diagram illustrating an example of a hardware configuration of the touch panel 219 of the interactive whiteboard 101 according to the embodiment. In the example of FIG. 3, LEDs 302 (a plurality of LEDs 302) and phototransistors 301 (a plurality of phototransistors 301) are disposed at equal intervals, and each of the plurality of LEDs 302 faces the corresponding phototransistor 301 of the plurality of phototransistors 301. Further, FIG. 3 illustrates the example where twenty LEDs 302 and twenty phototransistors 301 are disposed in the horizontal direction, and fifteen LEDs 302 and fifteen phototransistors 301 are disposed in the vertical direction. However, for a large touch panel 219, it is desirable to dispose additional LEDs 302 and phototransistors 301.

(Hardware Configuration of the Information Terminal 102)

Figure 4:
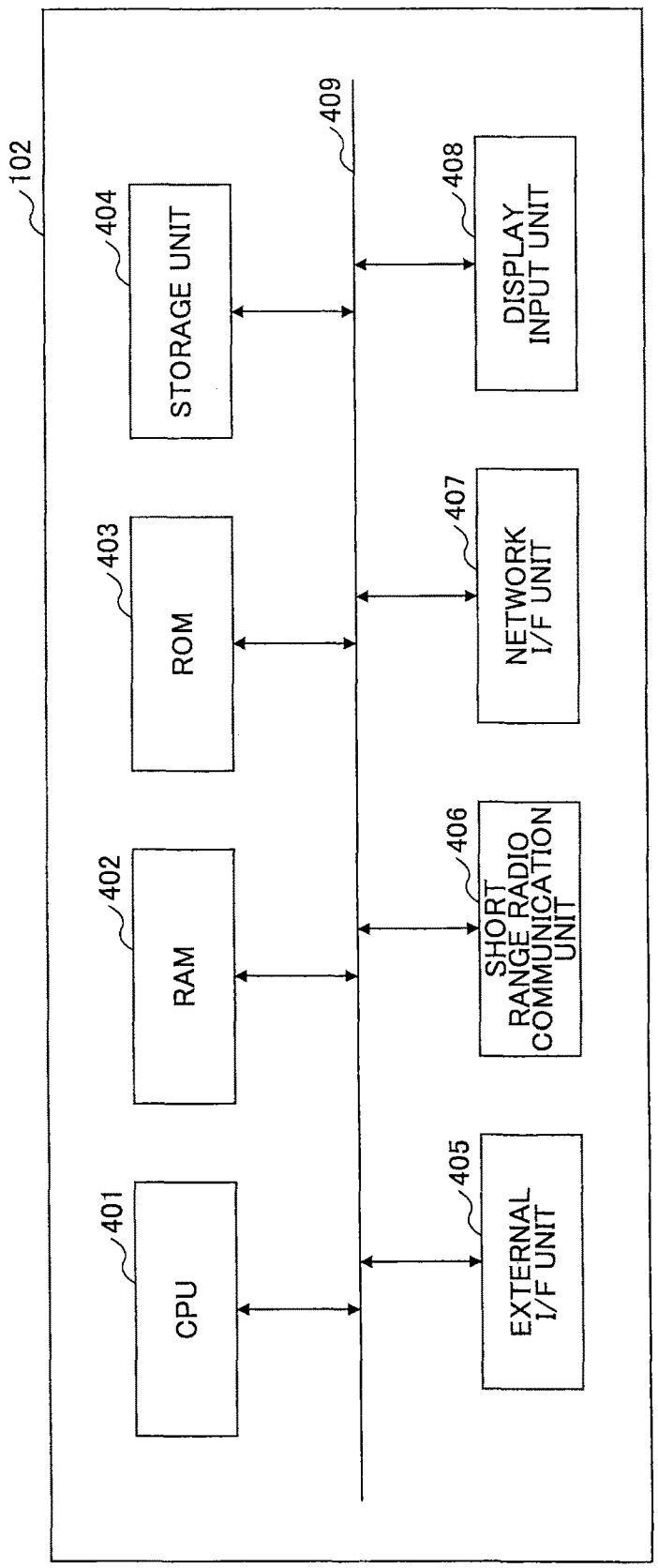
FIG. 4 is a diagram illustrating an example of a hardware configuration of an information processing terminal according to the embodiment.

FIG. 4 is a diagram illustrating an example of a hardware configuration of the information terminal 102 according to the embodiment. The information terminal 102 has a configuration of a generic computer. The information terminal 102 may include, for example, a CPU 401; a random access memory (RAM) 402; a ROM 403; a storage unit 404; an external I/F unit 405; a short range wireless communication unit 406; a network I/F unit 407; a display input unit 408; a bus 409, and so forth.

The CPU 401 is a processing unit to implement various functions of the information terminal 102 by reading out a program and data stored in the ROM 403 or the storage unit 404, by writing the read program and data in the RAM 402, and by executing processes. The RAM 402 is a volatile memory that can be used as a work area of the CPU 401. The ROM 403 is a non-volatile memory that can maintain a program and data, even if the power supply is turned off. The ROM 403 is formed of a flash ROM, for example. The storage unit 404 is a storage device, such as a hard disk drive (HDD), and a solid state drive (SSD). The storage unit 404 stores an operating system (OS), application software, and various types of data, for example.

The external I/F unit 405 is an interface to connect the information terminal 102 to an external device. Examples of the external device include a recording medium, such as a Universal Serial Bus (USB) memory, a memory card, and an optical disk; and various types of electronic devices.

The short range wireless communication unit 406 is a communication interface to execute short range wireless communication. Note that the short range wireless communication includes, for example, communication based on Bluetooth or the BLE. The network I/F unit 407 is a communication interface to connect the information terminal 102 to a network. The network I/F 407 may be a communication interface of a wireless LAN, for example.

The display input unit 408 is a device for displaying and for inputting, such as a touch panel display where a touch panel and a display are integrated. The display input unit 408 includes an input unit to operate the information terminal 102; and a display unit to display a processing result of the information terminal 102. However, the display input unit 408 may be a device in which the display unit and the input unit are separated. The bus 409 mutually connects the above-described components. The bus 409 transmits address signals, data signals, control signals, and so forth.

Embodiment

<Functional Configuration>

Figure 5:
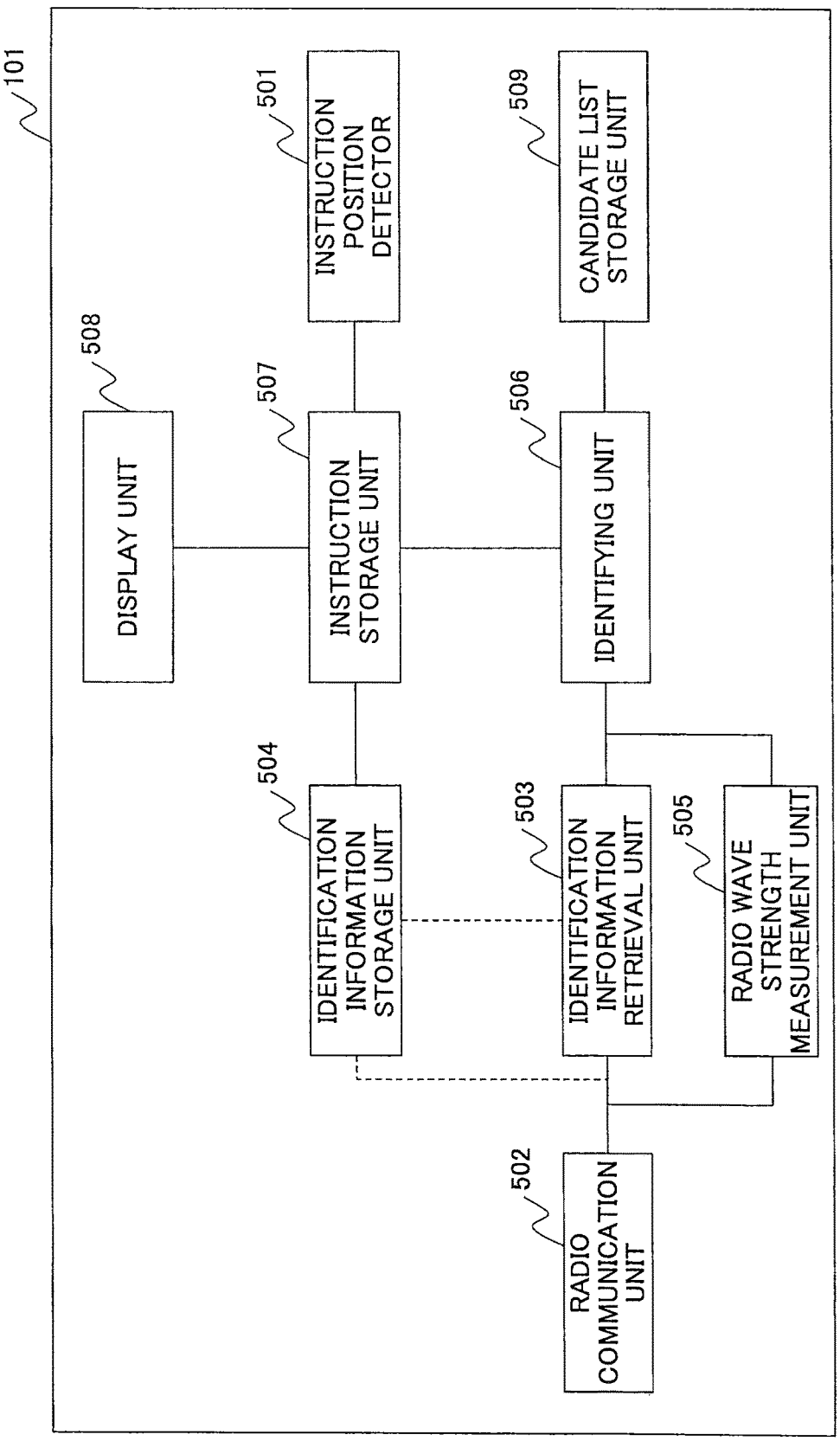
FIG. 5 is a diagram illustrating an example of a functional configuration of the interactive whiteboard according to the embodiment.

FIG. 5 is a diagram illustrating an example of a functional configuration of the interactive whiteboard 101 according to the embodiment. The interactive whiteboard 101 may include an instruction position detector 501; a radio communication unit 502; an identification information retrieval unit 503; an identification information storage unit 504; a radio wave strength measurement unit 505; a identifying unit 506; an instruction storage unit 507; a display unit 508; and a candidate list storage unit 509.

The instruction position detector (a detector) 501 is a unit to detect a position of an instruction (e.g., an image) on the input surface 107 (the touch panel 219). Here, the instruction is received from a user (an operator). The instruction position detector 501 can be achieved by the touch panel 219 and the touch panel I/F 217 of FIG. 2, and one or more programs executed by the CPU 201 of FIG. 2, for example.

The radio communication unit (a receiver) 502 receives, for example, by short range wireless communication based on the BLE, one or more radio waves that are output from one or more information terminals (mobile terminals) 102 located within the communication range 104. Additionally, the radio communication unit 502 transmits information, for example, by the short range wireless communication based on the BLE; and the radio communication unit 502 executes communication control. The radio communication unit 502 can be achieved by the short range wireless communication unit 207 and the first antenna 208 of FIG. 2, and one or more programs executed by the CPU 201 of FIG. 2, for example.

The identification information retrieval unit (a retrieval unit) 503 retrieves, from each of the one or more radio waves received by the radio communication unit 502, identification information (which is referred to as output terminal identification information, hereinafter) that identifies the information terminal 102 that outputs the radio wave. The identification information retrieval unit 503 can be achieved by the short range wireless communication unit 207 of FIG. 2, and one or more programs executed by the CPU 201, for example.

The identification information storage unit (a second storage unit) 504 defines correspondence between identification information for identifying each of a plurality of users (operators) (which is referred to as operator identification information, hereinafter) and the output terminal identification information for identifying the information terminal 102; and the identification information storage unit 504 stores the operator identification information and the associated output terminal identification information. The identification information storage unit 504 can be achieved by the hard disk 211 and the HD controller 212 of FIG. 2, and one or more programs executed by the CPU 201 of FIG. 2, for example.

The radio wave strength measurement unit (a measurement unit) 505 is a unit that measures strength of each of the radio waves received by the radio communication unit 502. The radio wave strength measurement unit 505 can be achieved by the short range wireless communication unit 207 of FIG. 2, and one or more programs executed by the CPU 201, for example. The radio wave strength measurement unit 505 outputs the strength of the received radio waves as Received Signal Strength Indication (RSSI) information or an RSSI signal, for example.

The identifying unit 506 identifies, based on the strength of each of the radio waves measured by the radio wave strength measurement unit 505 and the output terminal identification information retrieved by the identification information retrieval unit 503, the output terminal identification information of the radio wave output from the information terminal 102 of a user who inputs an instruction on the input surface 107. The identifying unit 506 can be achieved by one or more programs executed by the CPU 201 of FIG. 2, for example. In the embodiment, the identifying unit 506 determines that the output terminal identification information of the information terminal 102 corresponding of the radio wave with the greatest strength among the radio waves measured by the radio wave strength measurement unit 505 is the output terminal identification information of the radio wave output by the information terminal 102 owned by the user who inputs the instruction on the input surface 107.

The candidate list storage unit (a first storage unit) 509 stores a candidate list that stores, for each output terminal identification information retrieved by the identification information retrieval unit 503, the strength of the radio wave measured by the radio wave strength measurement unit 505. The candidate list storage unit 509 can be achieved by the main memory 202 or the hard disk 211 of FIG. 2, and one or more programs executed by the CPU 201 of FIG. 2, for example. Note that the candidate list is described below.

In this embodiment, the identifying unit 506 determines that the output terminal identification information of the information terminal 102 corresponding of the radio wave with the greatest strength among the strength levels of the radio waves stored in the candidate list storage unit 509 is the output terminal identification information output by the information terminal 102 owned by the user inputting the instruction on the input surface 107.

The instruction storage unit 507 defines correspondence between the operator identification information that is associated with the output terminal identification information identified by the identifying unit 506 and instruction position information indicating the position of the instruction, which is detected by the instruction position detector 501. Then, the instruction storage unit 507 stores the operator identification information and the associated instruction position information. The instruction storage unit 507 can be achieved by one or more programs executed by the CPU 201 of FIG. 2, the hard disk 211, and the HD controller 212, for example.

The display unit 508 displays, based on the operator identification information associated with the instruction position information in the instruction storage unit 507, the indication of the instruction of the instruction position information that is stored in the instruction storage unit 507 in such a manner that the user who inputs the instruction can be identified. The display unit 508 can be achieved by one or more programs executed by the CPU 201 of FIG. 2, the display unit 220 of FIG. 2, and the display controller 213 of FIG. 2, for example.

Note that the instruction storage unit 507 and the display unit 508 are an example of a controller to control execution of a process corresponding to the operator identified by the output terminal identification information (an example of the operator identification information) that is identified by the identifying unit 506.

<Flow of the Process>
(Process of Determining a User)

Figure 6:
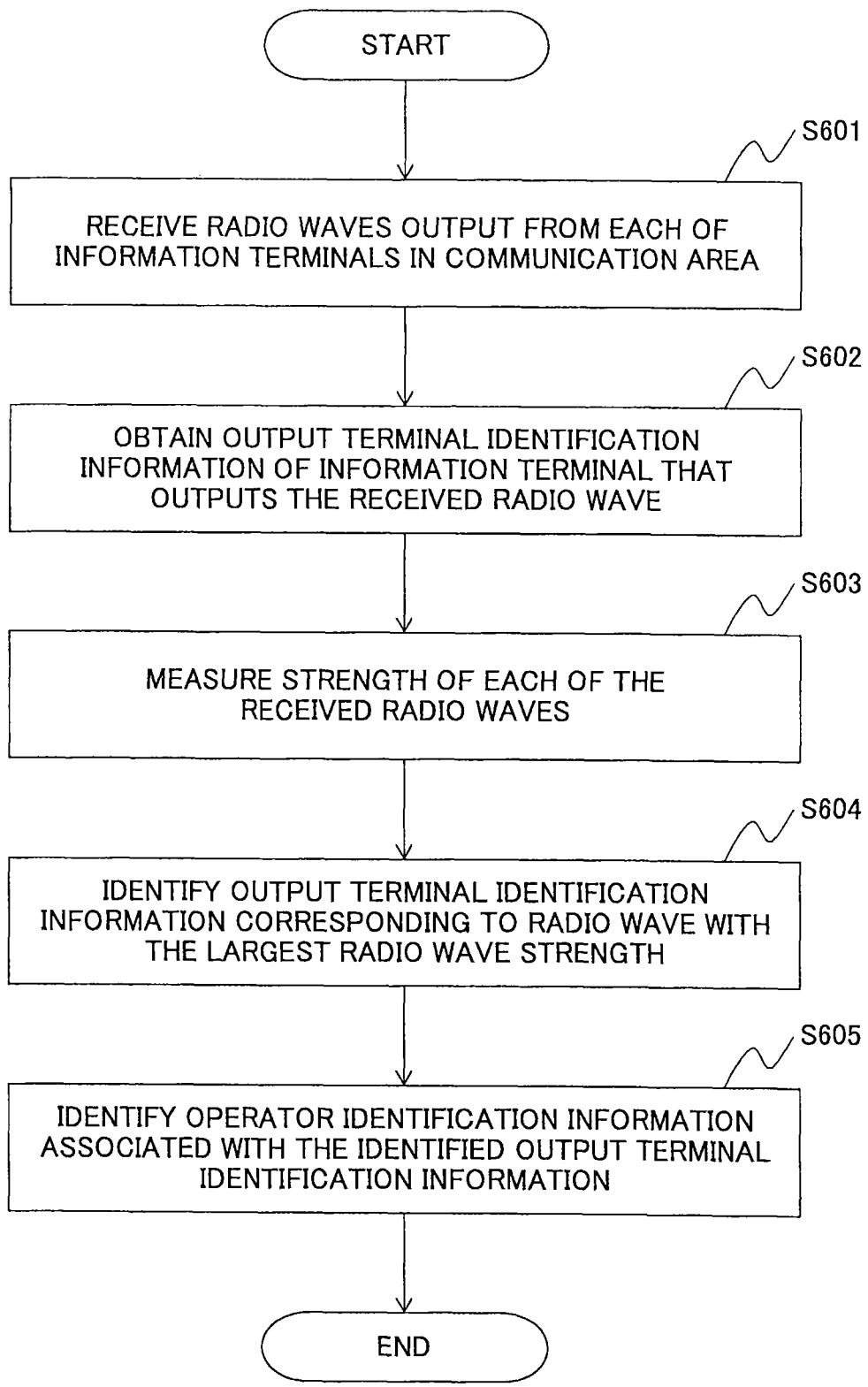
FIG. 6 is a flowchart illustrating an example of a process of determining an operator according to the embodiment.

FIG. 6 is a flowchart illustrating an example of a process of determining a user according to the embodiment. For example, in the system configuration of FIG. 1, the radio communication unit 502 of the interactive whiteboard 101 receives radio waves that are output from the information terminals 102-1 to 102-3, which are located within a communication area (the communication range 104) (step S601).

The identification information retrieval unit 503 of the interactive whiteboard 101 obtains, for each information terminal 102 that outputs the received radio wave, the output terminal identification information (step S602). Note that the output terminal identification information of the information terminal 102 is a value unique to the information terminal 102. It is assumed that the information terminal 102 can be uniquely identified based on the output terminal identification information of the information terminal 102.

Subsequently, the radio wave strength measurement unit 505 of the interactive whiteboard 101 measures (obtains) strength of each of the radio waves received from the information terminals 102-1 to 102-3 (step S603).

For example, for each output terminal identification information that is obtained at step S602, the strength of the radio wave measured at step S603 is stored in the candidate list storage unit 509.

Here, an example of the identification information of the information terminal 102 and an example of the method of obtaining the received signals are described.

Figure 7:
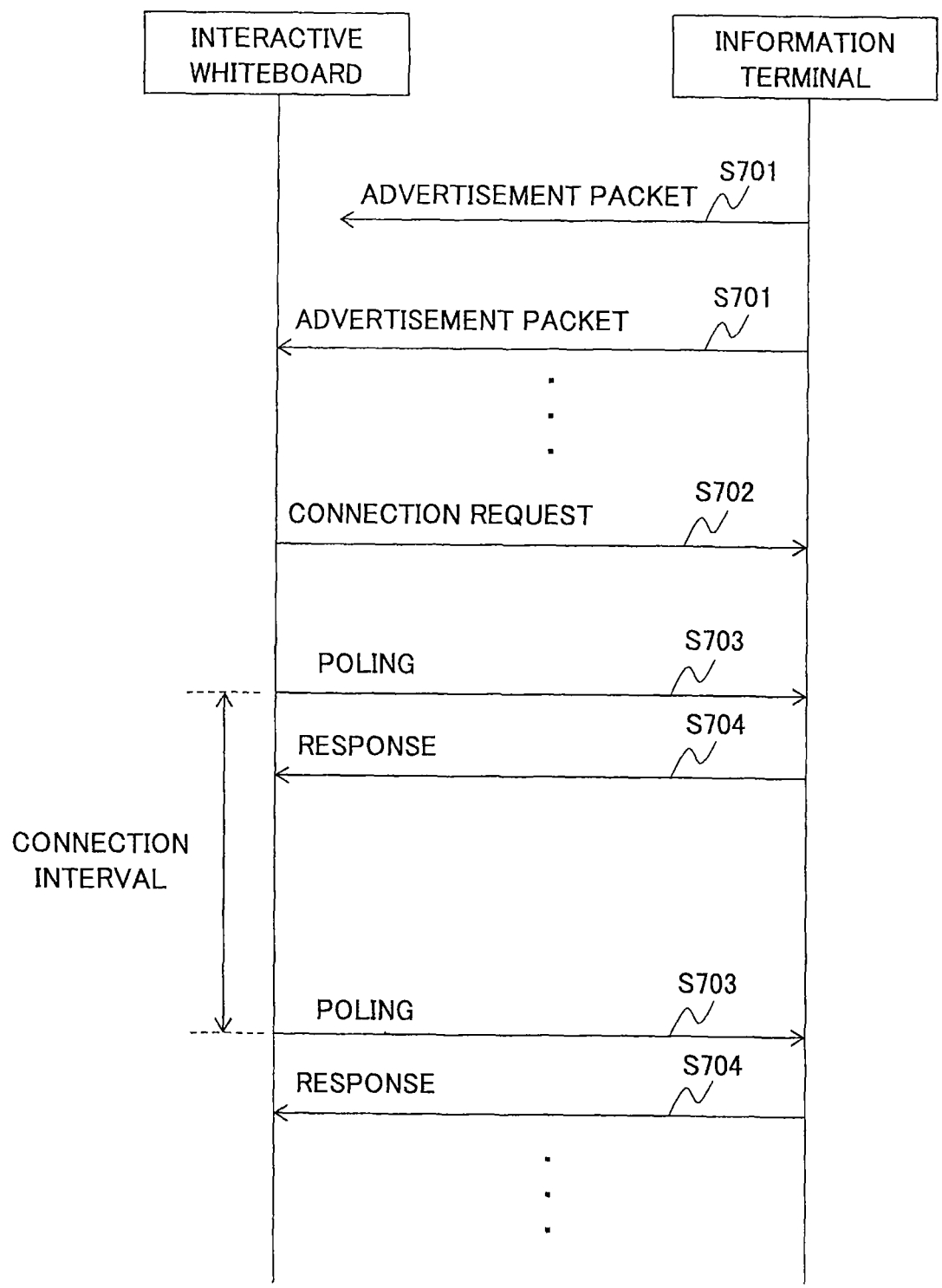
FIG. 7 is a sequence chart illustrating an example of a communication process according to the embodiment.

FIG. 7 is a sequence chart illustrating an example of a communication process according to the embodiment. Here, it is assumed that the short range wireless communication between the interactive whiteboard 101 and the information terminal 102 is based on the BLE.

The BLE is one of the extended standards of Bluetooth, which is a short range wireless communication technology standard. The BLE is a short range wireless communication technology standard that is developed as a part of the Bluetooth 4.0 standard. With the BLE, data communication can be implemented by short range wireless communication with lower energy consumption, compared to energy consumption of standard Bluetooth communication. In the following description, communication based on Bluetooth other than the BLE may be referred to as classic Bluetooth so as to distinguish the communication based on Bluetooth other than the BLE from the BLE communication.

At step S701 of FIG. 7, for example, in response to a predetermined operation by a user (or automatically at predetermined time intervals), the information terminal 102 starts to transmit advertisement packets to notify peripheral devices of presence of the own device. At this time, the information terminal 102 executes broadcast transmission of the advertisement packets during a predetermined transmission interval.

If the information terminal 102 enters, for example, the communication range 104 of the interactive whiteboard 101 of FIG. 1 with this state, the interactive whiteboard 101 receives the advertisement packets transmitted from the information terminal 102. The advertisement packet includes address information of the advertiser (the information terminal 102). Thus, the interactive whiteboard 101 may obtain the address information of the advertiser as the output terminal identification information of the information terminal 102, for example. Alternatively, the information terminal 102 may transmit the output terminal identification information that differs from the address information of the advertiser by using the advertisement packet.

Alternatively, the interactive whiteboard 101 that receives the advertisement packet may transmit a scan request to the information terminal 102 to request additional information from information terminal 102. In this case, in response to the scan request received from the interactive whiteboard 101, the information terminal 102 transmits, to the interactive whiteboard 101, the additional information including the identification information of the information terminal 102. In this manner, the interactive whiteboard 101 can receive the additional information that is transmitted from the information terminal 102, and the interactive whiteboard 101 can obtain the output terminal identification information of the information terminal 102, which is included in the received additional information.

At step S702, the interactive whiteboard 101, having obtained the identification information of the information terminal 102, transmits a connection request to the information terminal 102 that transmits the advertisement packet. Then, when the information terminal 102 receives the connection request from the interactive whiteboard 101, the information terminal 102 stops transmitting the advertisement packets, and the information terminal 102 transitions to a connected mode, for example.

During the connected mode, the interactive whiteboard 101 transmits polling information to the information terminal 102, for example, at predetermined connection intervals (e.g., 5 to 300 milliseconds) (step S703). Then, in response to receiving the polling information from the interactive whiteboard 101, the information terminal 102 transmits response information to the interactive whiteboard 101 (step S704). At this time, the information terminal 102 transmits, as the response information, the polling information including the identification of the information terminal 102, for example.

In response to receiving the response information transmitted from the information terminal 102, the interactive whiteboard 101 measures the strength of the received radio wave by using the radio wave strength measurement unit 505. In this manner, the interactive whiteboard 101 can measure the strength of the radio wave received from the information terminal 102 with a cycle that is equal to the above-described connection interval.

In the example of FIG. 7, a case is described where there is one information terminal 102. However, the interactive whiteboard 101 may execute, as a master device of the BLE communication, similar processes for a plurality of slave devices (information terminals 102).

Here, the process of FIG. 7 is for exemplifying purposes only, and the embodiment is not limited to this. For example, the interactive whiteboard 101 may form the BLE network only by using the advertisement packet, without transmitting the connection request to the information device 102. In this case, the interactive whiteboard 101 can obtain the identification information of the information terminal 102 and the strength of the received power through the advertisement packet received from the information terminal 102.

Further, the short range wireless communication that is used between the information terminal 102 and the interactive white board 101 may be based on another communication standard, such as classic Bluetooth. Furthermore, for the short range wireless communication between the information terminal 102 and the interactive whiteboard 101, in addition to the radio wave, a sound wave or a light wave may be used, for example.

Referring back to FIG. 6, the description of the flowchart is continued.

At step S604, the identifying unit 506 of the interactive whiteboard 101 identifies the output terminal identification information of the information terminal 102 that outputs the radio wave with the greatest strength, among the radio waves measured at step S603, for example. For example, the identifying unit 506 identifies the output terminal identification information corresponding to the radio wave with the greatest strength, among the strength levels of the radio waves stored in the candidate list storage unit 509.

At step S605, the identifying unit 506 identifies the operator identification information associated with the output terminal identification information that is identified at step S604.

FIGS. 8A to 8C are diagrams illustrating examples of the information used in the embodiment.

FIG. 8A shows an example of the information stored in the identification information storage unit 504. As illustrated in FIG. 8A, the identification information storage unit 504 defines the correspondence between the output terminal identification information 801, which is the identification of the information terminal 102, and the operator identification information 802, which is the identification information of the user, and the identification information storage unit 504 stores the output terminal identification information 801 and the associated operator identification information 802.

FIG. 8B illustrates an example of the radio wave strength information that is measured by the radio wave strength measurement unit 505 of the interactive whiteboard 101. As shown in FIG. 8B, for example, in the radio wave strength information that is output from the radio wave strength measurement unit 505, the output terminal identification information 801 of the information terminal 102 is associated with the radio wave strength of the information terminal 102.

FIG. 8C is a diagram illustrating an example of the candidate list that is stored in the candidate list storage unit 509. For example, the identifying unit 506 creates the candidate list that is illustrated in FIG. 8C by using the information of FIG. 8A and the information of FIG. 8B, and the candidate list storage unit 509 stores the created candidate list. The identifying unit 506 can identify that the output terminal identification information corresponding to the radio wave with the greatest radio wave strength is "ID0001" by using the candidate list of FIG. 8C. Furthermore, the identifying unit 506 can identify that the operator identification information associated with the identified output terminal identification information "ID0001" is "USER A" by using the candidate list of FIG. 8C.

By the above-described process, in response to detecting that image data is input on the input surface 107 of the interactive whiteboard 101, the interactive whiteboard 101 can identify the operator corresponding to the time interval of inputting the image data, for example.

Modified Example

In the above description, it is assumed that the interactive whiteboard 101 obtains the output terminal identification information of the information terminal 102 at step S602 of FIG. 6.

As another preferred example, the interactive whiteboard 101 may obtain information on a user of the information terminal 102 (e.g., the operator identification information, a user name, and an employee ID) from the information terminal 102 at step S602 of FIG. 6.

For example, at step S701 of FIG. 7, in response to receiving the advertisement packet transmitted by the information terminal 102, the interactive whiteboard 101 transmits a scan request to the information terminal 102 to request additional information from the information terminal 102. Upon receiving the scan request, the information terminal 102 transmits, to the interactive whiteboard 101, the additional information including pre-stored information on the user of the information terminal 102. In this manner, the interactive whiteboard 101 can obtain the information on the user of each information terminal 102.

Additionally, at this time, the interactive whiteboard 101 may obtain, as the information on the user, the operator identification information 802 from the information terminal 102. Then, the interactive whiteboard 101 may define correspondence between the obtained operator identification information 802 and the output identification information 801 of the information terminal 102, and the identification information storage unit 504 may store the operator identification information 802 and the associated output terminal identification information. In this manner, the interactive whiteboard 101 may omit the task of storing the operator identification information in the identification information storage unit 504.

Note that the output terminal identification information of the information terminal 102 and the information on the user of the information terminal 102 (e.g., the operator identification information, a user name, and an employee ID) are examples of the operator identification information for identifying a user (operator) holding (carrying) the information terminal 102.

(Process of Recording the Image Data)

Figure 9:
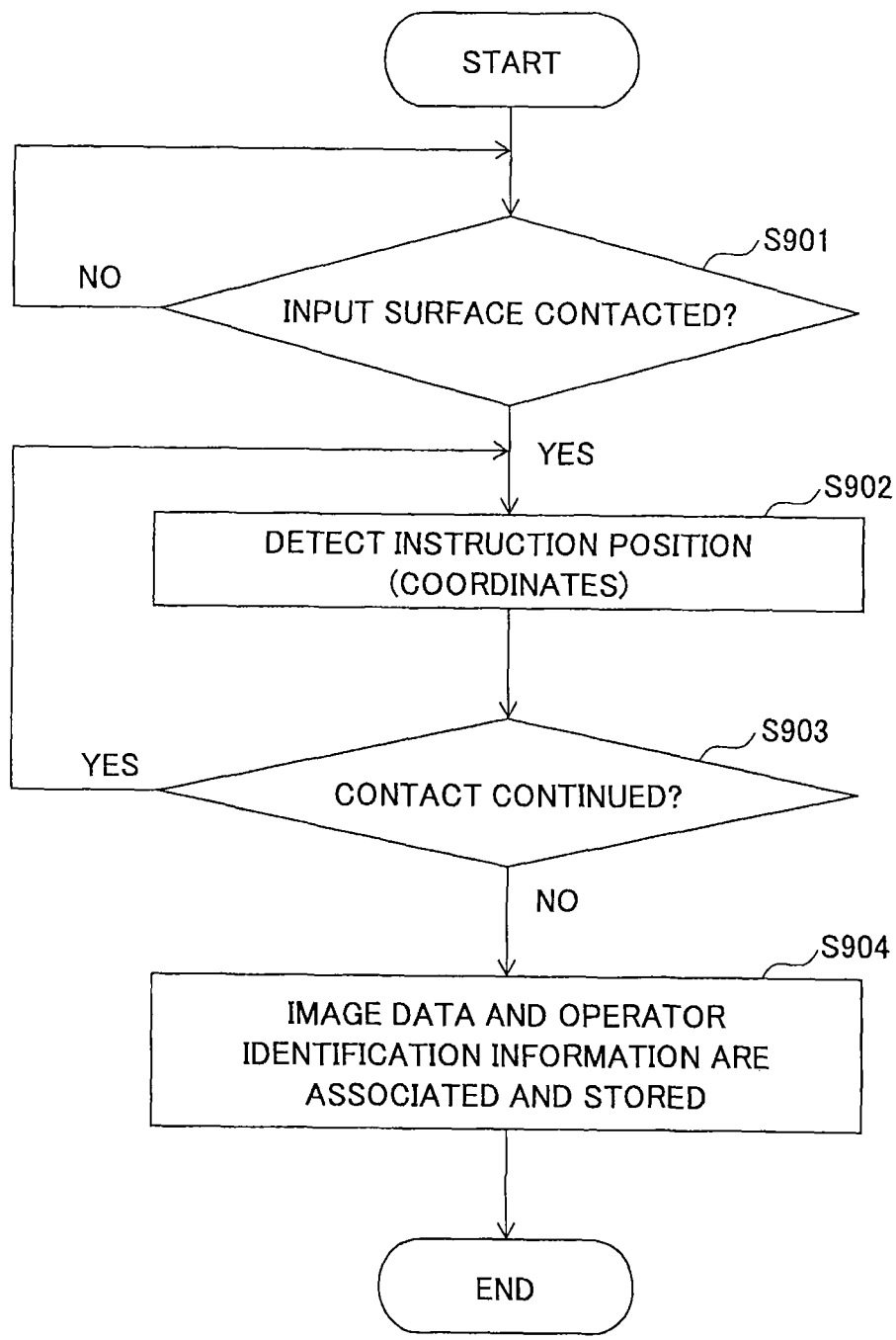
FIG. 9 is a flowchart illustrating an example of a process of recording image data according to the embodiment.

FIG. 9 is a flowchart illustrating an example of a process of recording the image data according to the embodiment.

At step S901, the instruction position detector 501 of the interactive whiteboard 101 determines whether the input surface 107 (the touch panel 219) of the interactive whiteboard 101 is touched. In response to detecting that the input surface 107 is touched, the process proceeds to step S902.

At step S902, the instruction position detector 501 detects (obtains) coordinate data of the contact position (position of the instruction) on the input screen 107. In response to detecting, at step S903, that the input screen 107 is still touched, the process returns to step S902, and the same process is repeated. Whereas, in response to determining, at S903, that the input screen 107 is no longer touched, the process of the interactive whiteboard 101 proceeds to step S904.

At step S904, the instruction storage unit 507 of the interactive whiteboard 101 defines correspondence between the image data obtained by the instruction position detector 501 (information on the position of the instruction) and the operator identification information of the current operator identified by the identifying unit 506; and the instruction storage unit 507 stores the image data and the associated operator identification information.

FIG. 10 is a diagram illustrating an example of image data information 1000 according to the embodiment. In the example of FIG. 10, correspondence is defined among writing date and time 1001, image data 1002, and operator identification information 1003; and the writing date and time 1001, the image data 1002, and the operator identification information 1003, which are associated, are recorded in the image data information 1000.

The writing date and time 1001 is information indicating date and time of a start or an end of a time period during which the image data is input on the input screen 107 of the interactive whiteboard 101.

The image data 1002 includes one or more sets of coordinates that are obtained by the instruction position detector 501 at step S902 of FIG. 9. In the example of FIG. 10, the image data 1002 also includes color information of the image data.

The operator identification information 1003 is information for identifying an operator (e.g., a user name, or an employee ID) who inputs the image data on the input screen 107 of the interactive whiteboard 101.

(Process of Displaying Image Data)

Figure 11:
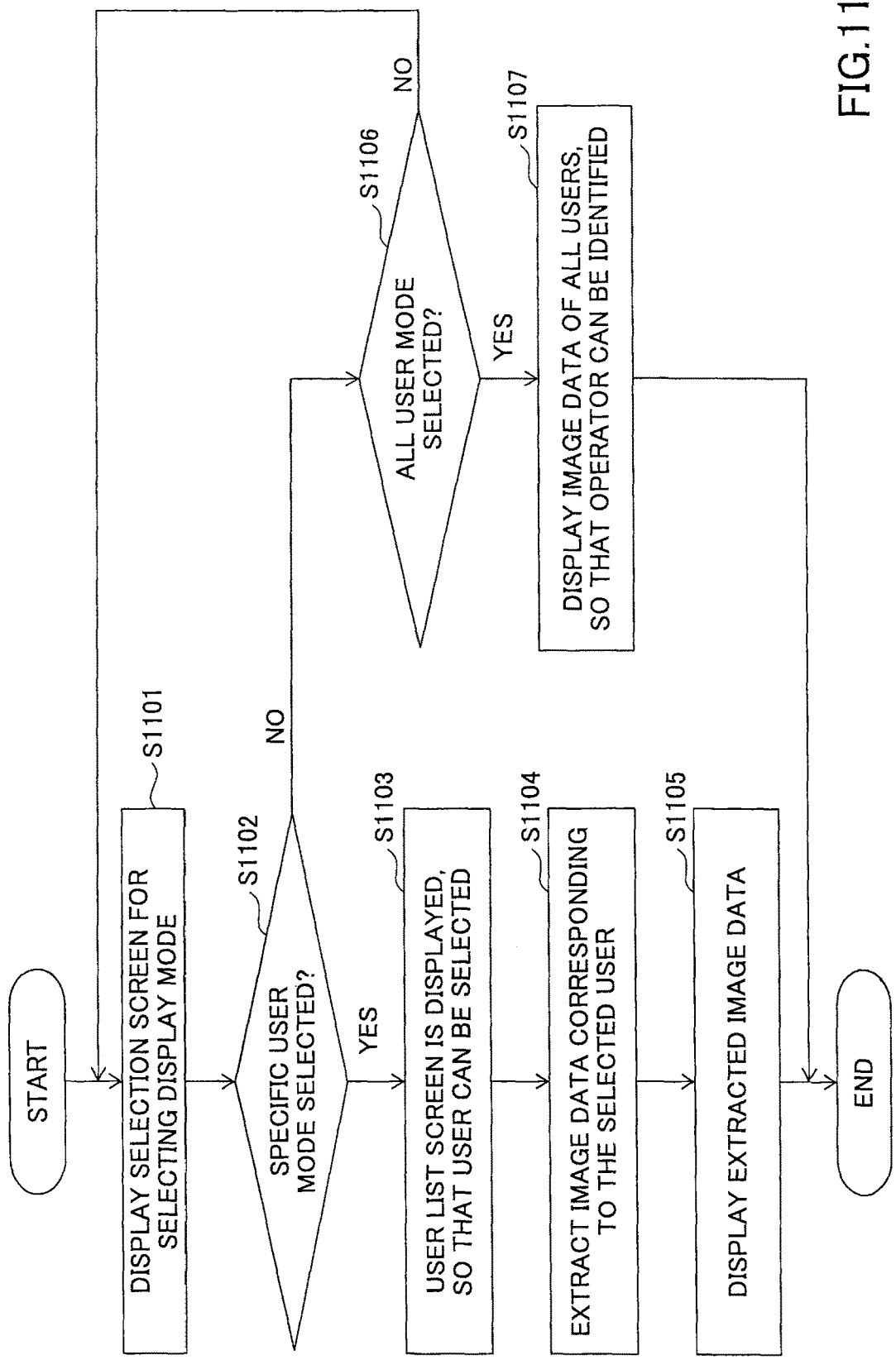
FIG. 11 is a flowchart illustrating an example of a process of switching display according to the embodiment.

FIG. 11 is a diagram illustrating an example of a process of switching display according to the embodiment.

At step S1101, in response to detecting a predetermined operation, such as an operation of pressing a dedicated icon displayed on the display unit 508, the interactive whiteboard 101 displays a selection screen for selecting a display mode on the display unit 508.

At step S1102, the interactive whiteboard 101 determines whether a specific user mode is selected on the selection screen for selecting a display mode. Upon detecting, at step S1102, that the specific user mode is selected, the process of the interactive whiteboard 101 proceeds to step S1103.

At step S1103, the display unit 508 of the interactive whiteboard 508 displays a user list screen in such a manner that a user can be selected in the user list screen.

FIG. 12 is a diagram illustrating an example of a display mode selection screen 1201 according to the embodiment. The display unit 508 displays, at step S1101 of FIG. 11, the selection mode display screen 1201, which is depicted in FIG. 12, for example. In the display mode selection screen 1201, a user can select one of an all user mode and a specific user mode.

In response to detecting that the specific user mode is selected in the display mode selection screen 1201, the display unit 508 displays the user list screen 1202, as illustrated in FIG. 12, for example. On the user list screen 1202, a list of users (user names), whose image data can be displayed, is displayed. In the user list screen 1202, it is possible to select a user whose image data is to be displayed.

Referring back to FIG. 11, the description of the flowchart is continued.

At step S1104, the display unit 508 of the interactive whiteboard 101 extracts, from the image data information 1000 stored in the instruction storage unit 507, the image data of the user (the user name) selected in the user list screen. As shown in FIG. 10, the image data 1002 and the operator identification information 1003 are associated and recorded in the image data information 1000. Thus, the display unit 508 can easily extract the image data of the selected operator.

At step S1105, the display unit 508 of the interactive whiteboard 101 displays the image data that is extracted at step S1104.

Here, if the specific user mode is not selected at step S1102, and if the all user mode is selected at step S1106, the display unit 508 of the interactive whiteboard 101 displays the image data of all the users at step S1107. At this time, the display unit 508 preferably displays the image data of all the users in such a manner that the operators who input the corresponding instructions (images) can be identified (e.g., by adding color to the corresponding image data). Furthermore, if the specific user mode is not selected at step S1102, and if the all user mode is not selected at step S1106, the process returns to step S1101 to repeat the processing.

FIG. 13 is a diagram illustrating an example of the display screen according to the embodiment. For example, if the all user mode is selected in the display mode selection screen 1201 of FIG. 12, an all user display screen 1301 depicted in FIG. 13 is displayed on the display unit 508. In the example of FIG. 13, images that are input by corresponding users (USER A, USER B, and USER D) are collectively displayed on the all user display screen 1301. In FIG. 13, for convenience of the description, for each user, the image is represented by using a corresponding line type. Actually, even if the images are drawn by using the same line type, the interactive whiteboard 101 can distinguish the users.

Whereas, if the specific user mode is selected in the display mode selection screen 1201 of FIG. 12, and if "USER B" is selected in the user list screen 1202, the display screen 1302 of the specific user (the USER B) is displayed, as illustrated in FIG. 13.

In this manner, in the interactive whiteboard 101 according to the embodiment, for each user, a corresponding image can be selectively displayed on the display unit 508.

Another Embodiment

In the system configuration of FIG. 1, radio characteristics of the short range wireless communication units 207 of the plurality of information terminals 102-1 to 102-3 may differ, for example. For example, even if the distances between each of the information terminals 102-1 to 102-3 and the interactive whiteboard 101 are the same, the strength levels of the received signals received by the interactive whiteboard 101 may differ.

In this embodiment, a process is described for registering, while the user is writing on the interactive whiteboard 101 (i.e., when the user is closest to the interactive whiteboard 101), the strength levels (the maximum values of the received signals) of the received signals received from the information terminals 102-1 to 102-3, respectively. In this manner, accuracy can be enhanced for the process of determining the user who inputs the image data.

(Registration Process)

Figure 14:
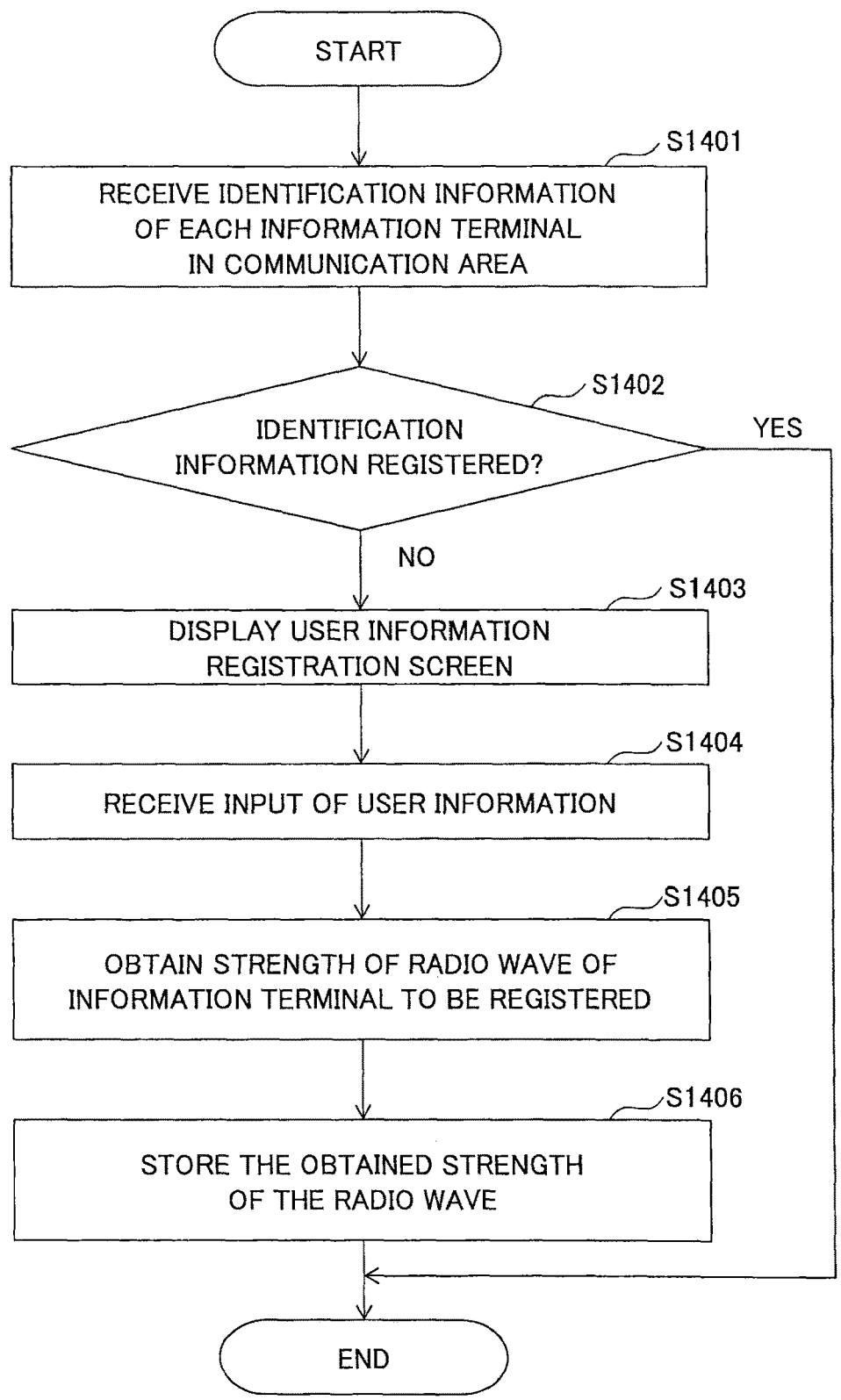
FIG. 14 is a flowchart illustrating an example of a process of registering user information according to another embodiment.

FIG. 14 is a diagram illustrating an example of a registration process for registering the user information according to the embodiment.

At step S1401, similar to the above-described embodiment, the interactive whiteboard 101 obtains identification information of the radio wave output from the information terminal 102 (the output terminal identification information) in the communication area (the communication range 104).

At step S1402, the interactive whiteboard 101 determines whether the identification information of the information terminal 102 obtained at step S1401 is registered in the identification information storage unit 504.

FIGS. 16A and 16B are diagrams illustrating examples of the information that is used in the embodiment. FIG. 16A is a diagram illustrating an example of the information that can be stored in the identification information storage unit 504 according to the embodiment. In the identification information storage unit 504 according to the embodiment, in addition to the information that is stored in the identification information storage unit 504 according to the above-described embodiment, which is illustrated in FIG. 8A, information on the maximum radio wave strength 1601 is added. The information on the maximum radio wave strength 1601 indicates the strength of the radio wave that is output from the information terminal 102 during the process of registering the information terminal 102 in the interactive whiteboard 101.

Referring back to FIG. 15, the description of the flowchart is continued.

At step S1402, if the identification information of the information terminal 102 obtained at step S1401 is registered in the identification information storage unit 504, the interactive whiteboard 101 ends the registration process.

If, at step S1402, it is determined that the identification information of the information terminal 102 that is obtained at step S1401 is not registered in the identification information storage unit 504, the process of the interactive whiteboard 101 proceeds to step S1403, and the registration process is to be executed.

At step S1403, the interactive whiteboard 101 causes the display unit 508 to display a registration screen for registering the user information.

At step S1404, the interactive whiteboard 101 receives input of the user information (e.g., operator identification information, such as a name of the user, and a user ID) that is input in the registration screen.

At step S1405, the interactive whiteboard 101 obtains (measures) the strength of the radio wave that is received from the information terminal 102 at a moment at which the user information is input.

At step S1406, the identification information storage unit 504 associates the strength of the radio wave obtained at step S1405 with the output terminal identification information 801 and the operator identification information 802 that is received at step S1404, and the identification information storage unit 504 stores the strength of the radio wave associated with the output terminal identification information 801 and the operator identification information 802.

Note that, by preregistering the output terminal identification information 801 of the information terminal 102 and the operator identification information 802 in the identification information storage unit 504, inputting of the user information at step S1403 and S1404 can be omitted. In this case, for example, it can be configured such that a user interface (UI), such as a "registration" button, is displayed on the display unit 508, and that the information on the maximum radio wave strength 1601 is registered upon detecting that a user presses the "registration" button.

(Determination Process)

Figure 15:
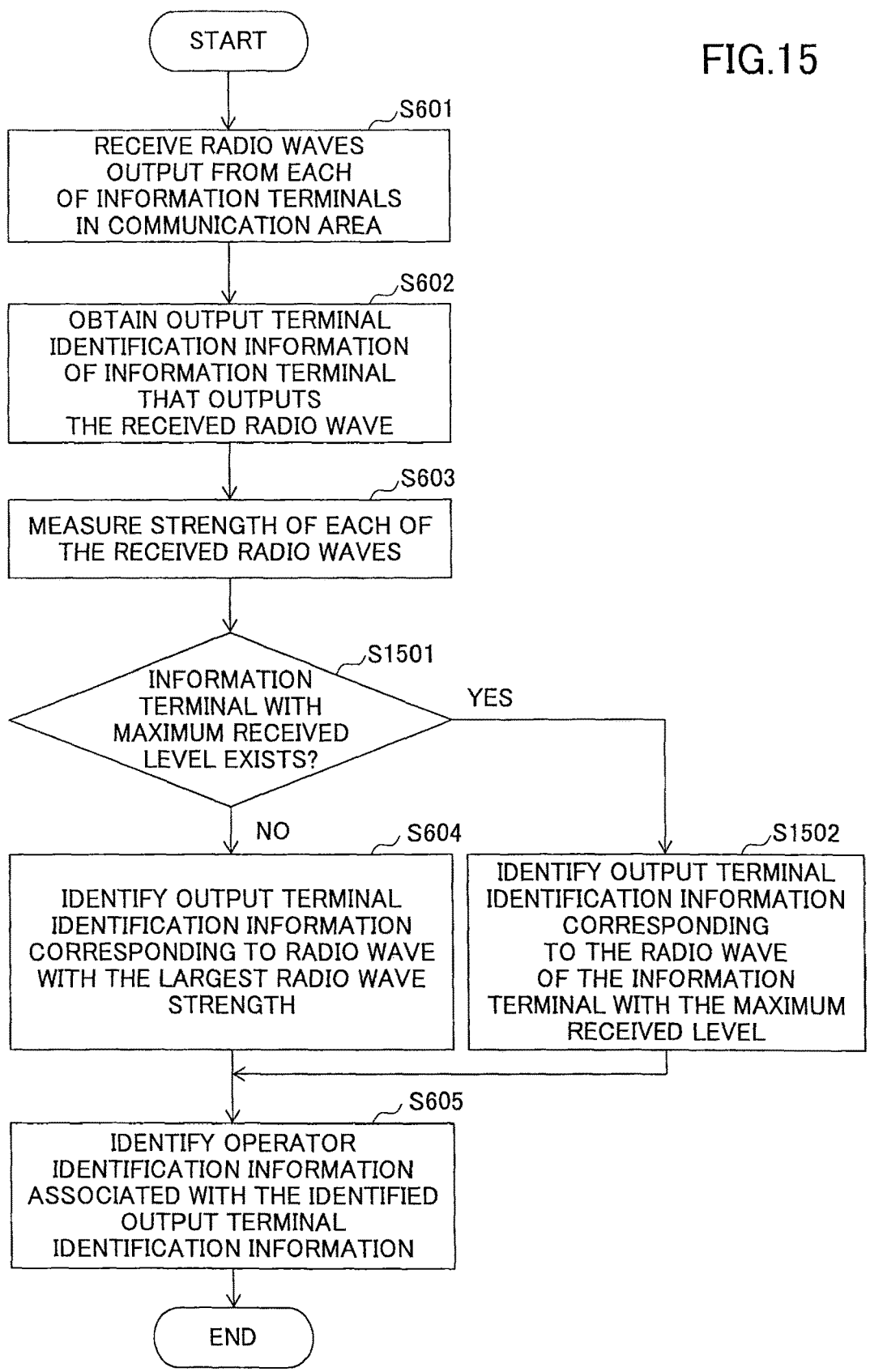
FIG. 15 is a flowchart illustrating an example of the process of determining the operator according to the other embodiment.

FIG. 15 is a flowchart illustrating an example of a determination process of determining a user according to the embodiment. Here, the differences from the above-described embodiment are mainly described because, in FIG. 15, the process of steps S801 to S804 is the same as the process of determining a user according to the above-described embodiment, which is explained by referring to FIG. 6.

At step S1501 of FIG. 15, the identifying unit 506 of the interactive whiteboard 101 determines whether there is an information terminal 102 with the radio wave strength that reaches the maximum radio wave strength 1601 recorded in the identification information storage unit 504, among the plurality of information terminals 102 within the communication range 104.

If it is determined, at step S1501, that there is no information terminal 102 with the radio wave strength that reaches the maximum radio wave strength 1601 recorded in the identification information storage unit 504, the operator is determined, at step S604, by a process similar to the process of the above-described embodiment.

If it is determined at step S1501 that there is an information terminal 102 with the radio wave strength that reaches the maximum radio wave strength 1601 that is recorded in the identification information storage unit 504, the process of the interactive whiteboard 101 proceeds to step S1502. Note that the determination as to whether the radio wave strength reaches the maximum radio wave strength 1601 may include not only the determination as to whether the radio wave strength completely reaches the maximum radio wave strength 1601, but also a determination as to whether the radio wave strength is in a predetermined range (e.g., within 1 dB) from the maximum radio wave strength.

At step S1502, the identifying unit 506 of the interactive white board 101 identifies the output terminal identification information corresponding to the information terminal 102 with the radio wave strength that reaches the maximum radio wave strength 1601, among the information terminals 102. Here, the radio wave strength of each of the information terminals 102 is obtained at step S603. For example, the identifying unit 506 identifies, among the radio wave strength levels that are stored in the candidate list storage unit 509, the radio wave strength that reaches the maximum radio wave strength 1601, and the identifying unit 506 identifies the information terminal 102 corresponding the radio wave strength that reaches the maximum radio wave strength 1601.

At step S605, similar to the above-described embodiment, the identifying unit 506 identifies the operator identification information that is associated with the output terminal identification information identified at step S604 or step S1502.

FIG. 16B is a diagram illustrating an example of the candidate list stored in the candidate list storage unit 509 according to the embodiment. In the example of FIG. 16B, the information terminal 102 of "USER A" has the greatest value of the radio wave strength 803. However, in the embodiment, the identifying unit 506 determines that the "USER B" is the current operator because the value of the radio wave strength 803 of the "USER B" reaches the maximum radio wave strength 1601.

By the above-described determination process, the accuracy of the process of determining the operator can be enhanced in situations where the radio characteristics of the short range radio communication units of the information terminals 102 differ.

Another Embodiment

In the above-described embodiments, the user who inputs the image data is identified by the strength of the received signal of the radio wave that is received by the interactive whiteboard 101 from the information terminal 102. In this embodiment, an example of a case is described where the interactive whiteboard 101 identifies a user who inputs the image data by additionally using an image that is captured by a camera, for example.

<System Configuration>

FIG. 17 is a diagram illustrating an example of a system configuration of the image processing system 100 according to this embodiment. As shown in FIG. 17, two cameras 1801 and 1802 are installed at the upper part of the interactive whiteboard 101 according to the embodiment. Further, the camera 1801 is configured to capture an image of a user 103-1 who inputs an image on the interactive whiteboard 101, and the camera 1802 is configured to capture an image of a user 103-2 who input an image on the interactive whiteboard 101, for example. Here, the number of the cameras 1801 and 1802 of FIG. 17 is for exemplifying purposes only, and the number of the cameras is not limited to this.

<Hardware Configuration>

Figure 18:
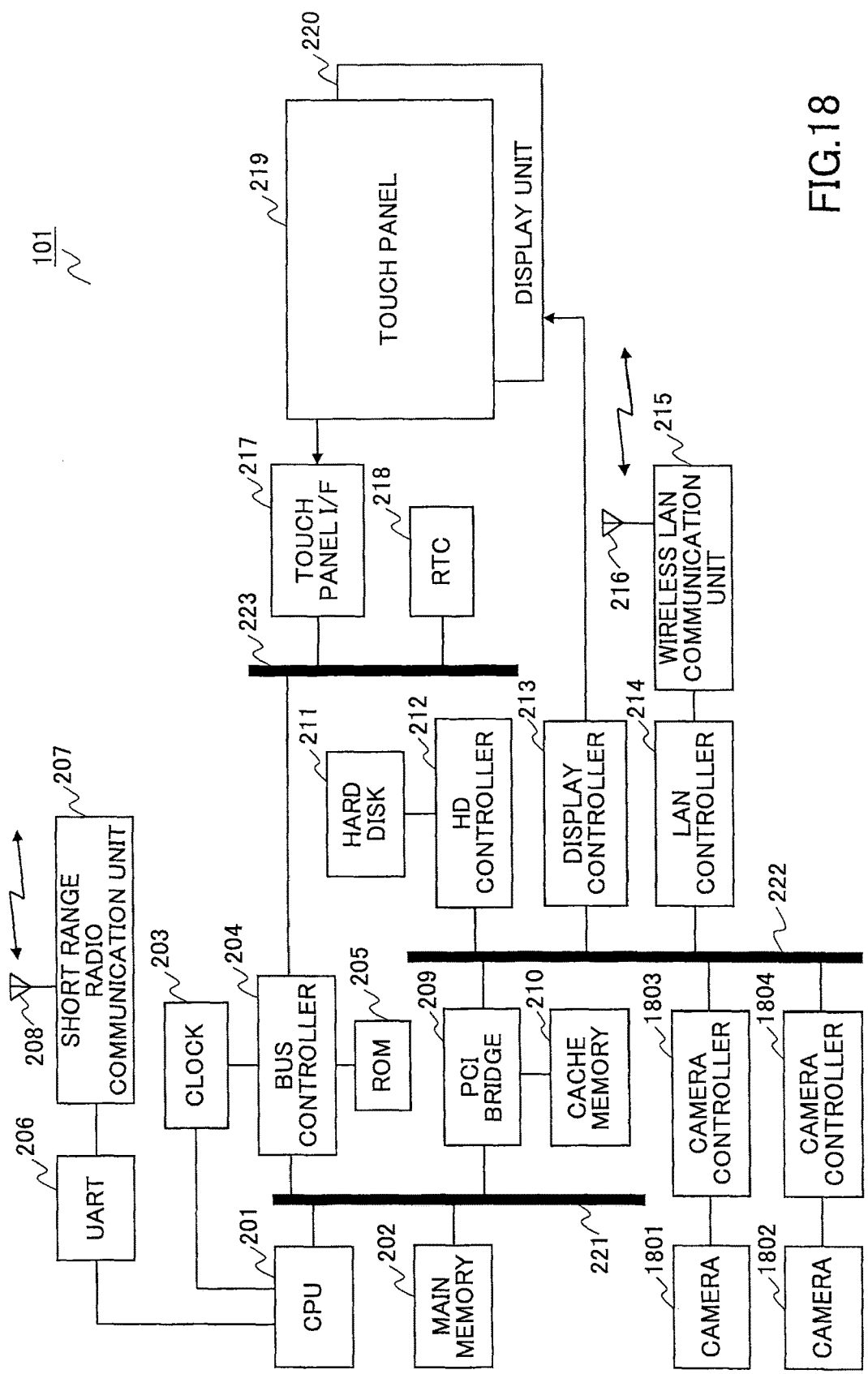
FIG. 18 is a diagram illustrating an example of the hardware configuration of the interactive whiteboard according to the other embodiment.

FIG. 18 is a diagram illustrating a hardware configuration of the interactive whiteboard 101 according to this example. The interactive whiteboard 101 according to this embodiment includes the camera 1801, the camera 1802, a camera controller 1803, and a camera controller 1804, in addition to the components that are illustrated in FIG. 2. Here, the differences from the above-described embodiments are mainly described because the configuration other than the configuration of the camera 1801, the camera 1802, the camera controller 1803, and the camera controller 1804 is the same as the configuration of the above-described embodiments.

The camera 1801 generates, for example, a national television system committee (NTSC) video signal from a pixel signal that is output from a two-dimensional image sensor, and the camera 1801 outputs the generated video signal to the camera controller 1803. The camera 1802 generates, for example, a NTSC video signal from a pixel signal that is output from a two-dimensional image sensor, and the camera 1802 outputs the generated video signal to the camera controller 1804.

The camera controller 1803 applies an analog-to-digital conversion process to the NTSC video signal that is input from the camera 1801. Subsequently the camera controller 1803 converts the A/D converted signal into a signal in a YUV (Y:U:V=4:2:2) format, and the camera controller 1803 transmits the signal to the main memory 202 on a frame-by-frame basis. Similarly, the camera controller 1804 applies an analog-to-digital conversion process to the NTSC video signal that is input from the camera 1802. Subsequently the camera controller 1804 converts the A/D converted signal into a signal in a YUV (Y:U:V=4:2:2) format, and the camera controller 1804 transmits the signal to the main memory 202 on a frame-by-frame basis.

<Functional Configuration>

Figure 19:
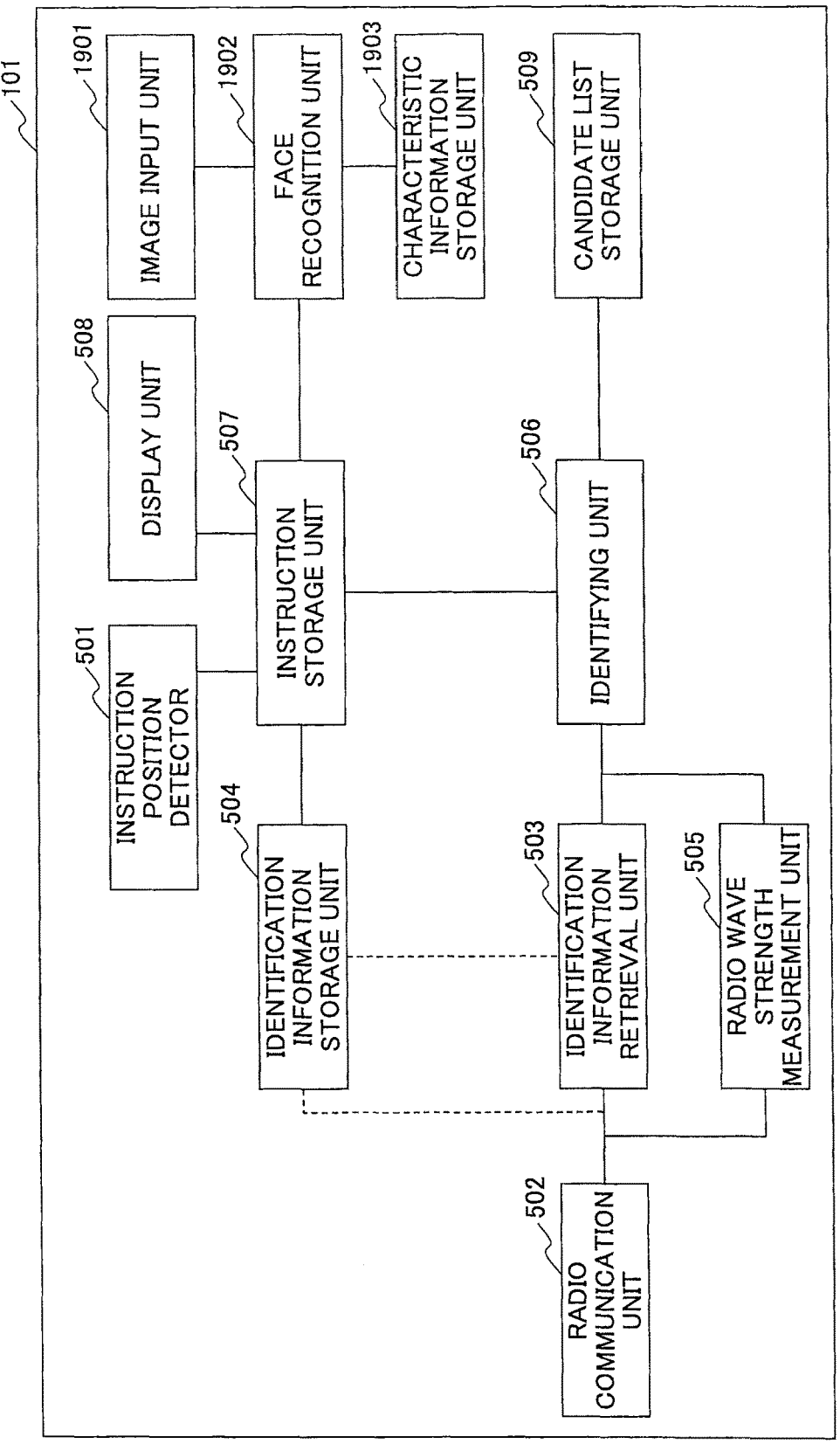
FIG. 19 is a diagram illustrating an example of the functional configuration of the interactive whiteboard according to the other embodiment.

FIG. 19 is a diagram illustrating a functional configuration of the interactive whiteboard 101 according to this embodiment. The interactive whiteboard 101 according to this embodiment includes, in addition to the components of the interactive whiteboard 101 according to the above-described embodiment that is described by referring to FIG. 5, an image input unit 1901; a face recognition unit 1902; and a characteristic information storage unit 1903. Here, the differences from the above-described embodiments are mainly described because the configuration other than the above-described configuration is the same as the configuration of the above-described embodiment.

The image input unit 1901 transmits video data that is input by the cameras 1801 and 1802 and that are converted in the YUV format to the face recognition unit 1902 on a frame-by-frame basis.

The face recognition unit 1902 extracts an image of a face portion from the image data corresponding to one frame, and the face recognition unit 1902 extracts characteristic data from the image of the face portion. Additionally, the face recognition unit 1902 identifies an operator by using the extracted characteristic data, and characteristic information that is pre-stored in the characteristic information storage unit 1903.

The characteristic information storage unit 1903 associates the characteristic information of the user (the characteristic data) with the identification information of the user (the operator identification information), and the characteristic information storage unit 1903 stores, in advance, the characteristic information (characteristic data) of the user associated with the identification information of the user (the operator identification information).

For example, as illustrated in FIG. 17, the face image of the user 103-1 is captured by the camera 1801, and the user 103-1 is identified by a face recognition technique. Similarly, the face image of the user 103-2 is captured by the camera 1802, and the user 103-2 is identified by a face recognition technique.

<Flow of the Process>

Figure 20:
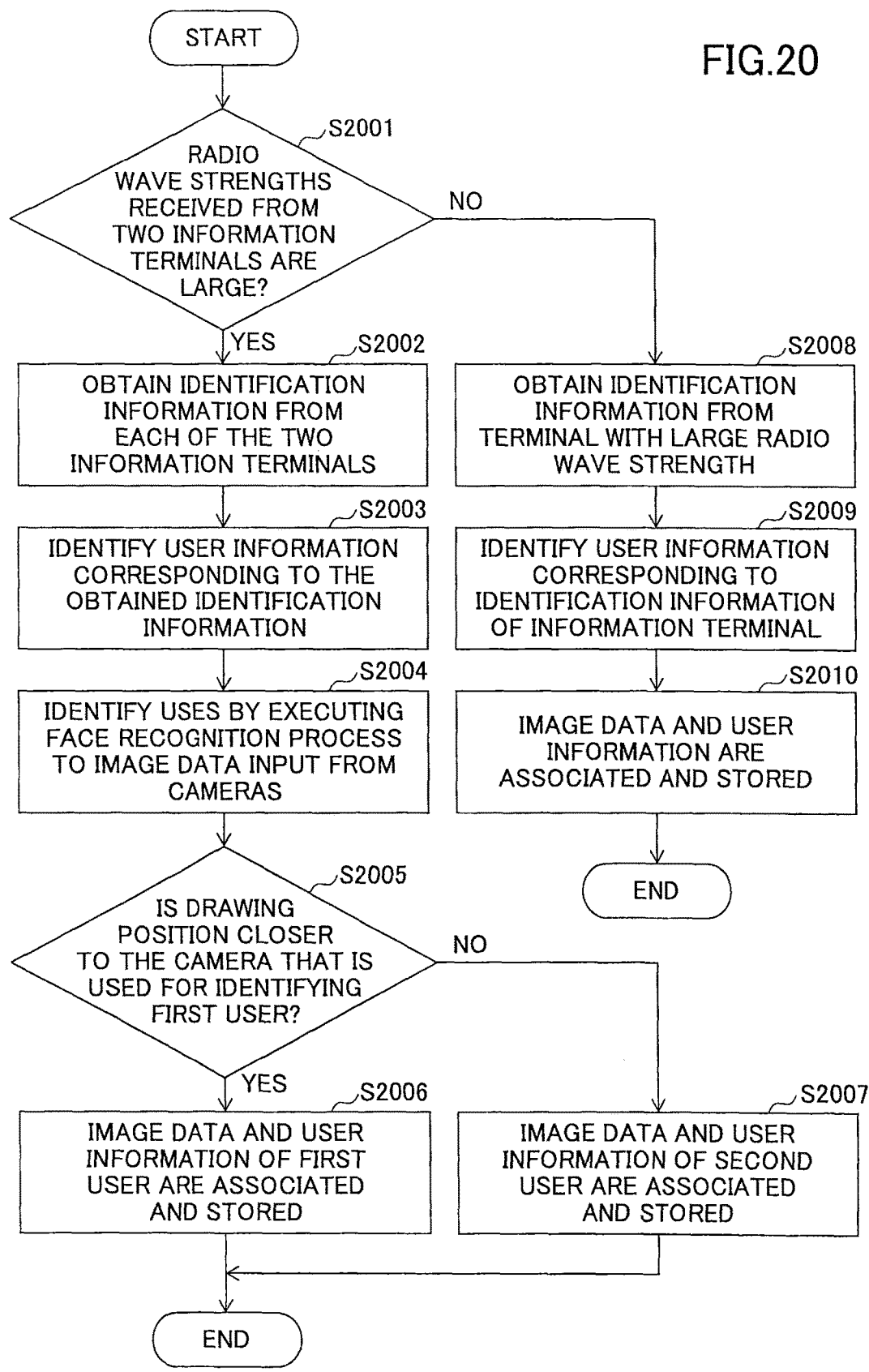
FIG. 20 is a flowchart illustrating an example of a flow of a process by the interactive whiteboard according to the other embodiment.

FIG. 20 is a flowchart illustrating the flow of the process by the interactive whiteboard 101 according to the embodiment.

Here, the process is described for a case where the user 103-1 holding the information terminal 102-1 and the user 103-2 holding the information terminal 102-2 write on the interactive whiteboard 101, respectively.

At step S2001, the interactive whiteboard 101 determines whether both the received signal strength of the radio wave received from the information terminal 102-1 and the received signal strength of the radio wave received from the information terminal 102-2 are large. Here, the radio wave strength measurement unit 505 of the interactive whiteboard 101 determines that both the received signal strength of the radio wave received from the information terminal 102-1 and the received signal strength of the radio wave received from the information terminal 102-2 are large because both the user 103-1 and the user 103-2 write on the interactive whiteboard 101. Then, the process proceeds to step S2002.

At step S2002, the identification information retrieval unit 503 of the interactive whiteboard 101 retrieves identification information from each of the information terminal 102-1 and the information terminal 102-2.

At step 2003, the identifying unit 506 of the interactive whiteboard 101 identifies (obtains) the identification information of the user corresponding to the identification information of the information terminal 102 that is obtained by the identification information retrieval unit 503 based on the identification information stored in the identification information storage unit 504. Here, the identification information of the user 103-1 and the identification information of the user 103-2 are obtained.

At step S2004, the face recognition unit 1902 of the interactive whiteboard 101 executes a face recognition process with respect to the image data that is input from the camera 1801 and to the image data that is input from the camera 1802, and thereby the face recognition unit 1902 identifies the users.

For example, the identifying unit 506 of the interactive whiteboard 101 determines that there are two users located at respective positions at which the users can write on the interactive whiteboard 101, and the identifying unit 506 of the interactive whiteboard 101 instructs the face recognition unit 1902 to start the process of the face recognition. The face recognition unit 1902 that receives the instruction extracts, from the image data that is input from the camera 1801, the characteristic data of the face of the user 103-1, and the face recognition unit 1902 compares the extracted characteristic data with the characteristic information stored in the characteristic information storage unit 1903 so as to identify the user 103-1. Similarly, the face recognition unit 1902 extracts, from the image data that is input from the camera 1802, the characteristic data of the face of the user 103-2, and the face recognition unit 1902 compares the extracted characteristic data with the characteristic information stored in the characteristic information storage unit 1903 so as to identify the user 103-2.

Further, the face recognition unit 1902 associates the identification information of the camera 1801 (the camera ID) with the identification information of the user 103-1 (the user ID), and the face recognition unit 1902 reports, to the identifying unit 506, the identification information of the camera 1801 associated with the identification information of the user 103-1. Similarly, the face recognition unit 1902 associates the identification information of the camera 1802 (the camera ID) with the identification information of the user 103-2 (the user ID), and the face recognition unit 1902 reports, to the identifying unit 506, the identification information of the camera 1802 associated with the identification information of the user 103-2.

At step S2005, the identifying unit 506 determines whether data of a set of the coordinates that is detected by the instruction position detector 501 is closer to the camera 1801 that is used for identifying the user 103-1, compared to data of another set of the coordinates.

At step S2005, if it is determined that the data of the set of the coordinates that is detected by the instruction position detector 501 is closer to the camera 1801 that is used for identifying the user 103-1, compared to the data of the other set of the coordinates, the process proceeds to step S2006. At step S2006, the instruction storage unit 507 of the interactive whiteboard 101 associates the image data obtained by the instruction position detector 501 with the identification information of the user 103-1, and the instruction storage unit 507 stores the image data associated with the identification information of the user 103-1.

If it is detected, at step S2005, that the data of the set of the coordinates that is detected by the instruction position detector 501 is not closer to the camera 1801 that is used for identifying the user 103-1, compared to the data of the other set of the coordinates, the process proceeds to step S2007. At step S2007, the instruction storage unit 507 of the interactive whiteboard 101 associates the image data that is obtained by the instruction position detector 501 with the identification information of the user 103-2, and the instruction storage unit 507 stores the image data that is associated with the identification information of the user 103-2.

If it is detected, at step S2001, that both the signal strength of the radio wave received from the information terminal 102-1 and the signal strength of the radio wave received from the information terminal 102-2 are small, the interactive whiteboard 101 executes, at steps from S2008 to S2010, the process similar to the process of the above-described embodiment, for example.

With the above-described process, even if both the user 103-1 holding the information terminal 102-1 and the user 103-2 holding the information terminal 102-2 write on the interactive whiteboard 101, the user who inputs the image data can be identified.

Another Embodiment

The image processing system 100 can be configured in various ways other than the configurations of the above-described embodiments. Here, a configuration other than the configurations according to the above-described embodiments is simply described.

Figure 21:
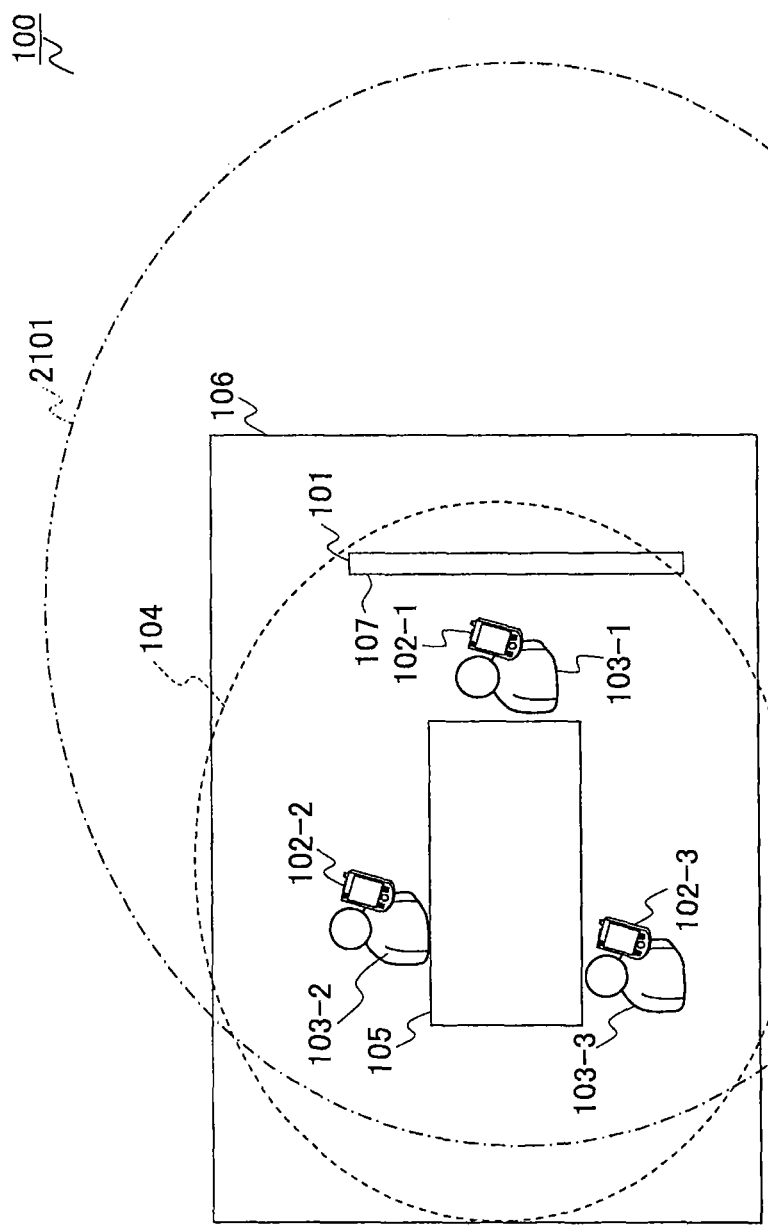
FIG. 21 is a diagram illustrating an example of positions of users according to another embodiment.

FIG. 21 is a diagram illustrating an example of an arrangement of users according to this embodiment. The components of the system configuration of FIG. 21 are the same as the components of the system configuration of the image processing system 100, which are explained by referring to FIG. 1. Here, it is assumed that the user 103-1 is located (sitting) at a position that is close to the input surface 107 at the center front portion of the interactive whiteboard 101.

Additionally, it is assumed that, in this state, the user 103-2 writes on the interactive whiteboard 101 and returns to the own seat; and subsequently the user 103-3 writes on the interactive whiteboard 101 and returns to the own seat, for example.

Figure 22:
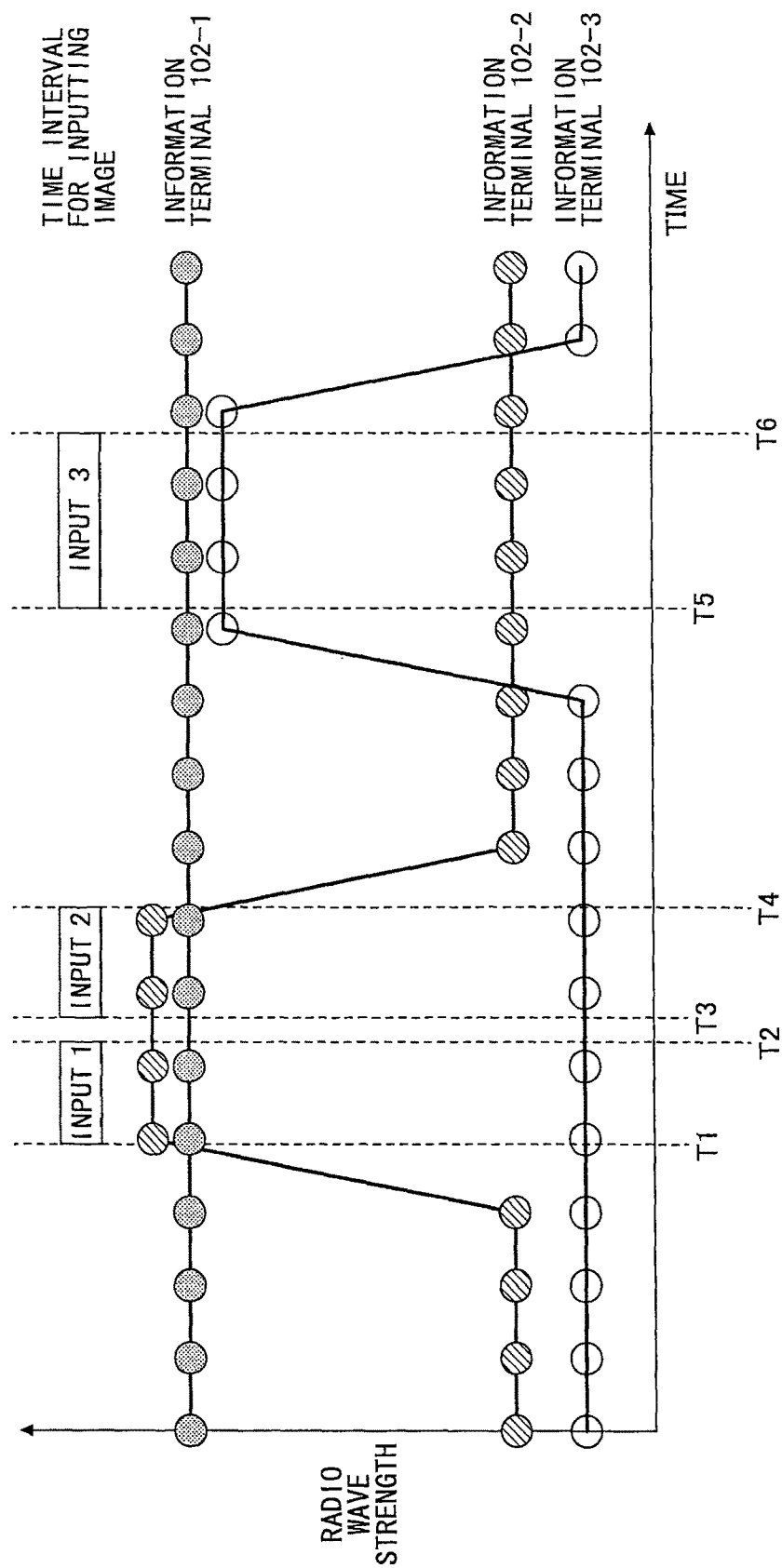
FIG. 22 is a diagram illustrating an example of variation of radio wave intensity according to the other embodiment.

FIG. 22 illustrates an example of the variations of the strength levels of the radio waves from the information terminals 102-1 to 102-3, respectively, which can be measured by the interactive whiteboard 101 at this time. In FIG. 22, the strength of the radio wave from the information terminal 102-1 of the user 103-1 is relatively strong because the location of the user 103-1 is close to the interactive whiteboard 101. In addition, the strength of the radio wave from the information terminal 102-1 of the user 103-1 is almost constant because the user 103-1 does not write on the interactive whiteboard 101.

Whereas, the strength of the radio wave from the information terminal 102-2 of the user 103-2 gradually increases as the user 103-2 approaches the front portion of the interactive whiteboard 101 from the own seat. The user 103-2 makes an input 1 during the time interval from T1 to T2, and the user 103-2 makes an input 2 during the time interval from T3 to T4, for example. During the time interval in which the user 103-2, who finishes writing on the interactive whiteboard 101, returns to the own seat, the strength of the radio wave from the information terminal 102-2 decreases. Here, the start time T1 of the input 1 is, for example, the time at which the user 103-2 starts contacting the input surface 107 of the interactive whiteboard 101. The finish time T2 of the input 1 is, for example, the time at which the user 103-2 stops contacting the input surface 107 of the interactive whiteboard 101.

Similarly, the strength of the radio wave from the information terminal 102-3 of the user 103-3 gradually increases as the user 103-3 approaches the front portion of the interactive whiteboard 101 from the own seat. The user 103-3 makes an input 3 during the time interval from the time T5 to the time T6, for example. During the time interval during which the user 103-3, who finishes writing on the interactive whiteboard 101, returns to the own seat, the strength of the radio wave from the information terminal 102-3 decreases.

In such a case, it may be difficult for the interactive whiteboard 101 to identify the uses who make the input 1, the input 2, and the input 3, for example, based only on the strength levels of the radio waves received from the information terminals 102-1 to 102-3. In the example of FIG. 22, it is difficult to determine which user is inputting the image data during the time period from the time T5 to the time T6, in which the input 3 is made, based only on the strength of the radio wave from the information terminal 102 during the time period from the time T5 to the time T6.

In such a case, the interactive whiteboard 101 continues recording the strength of the radio wave from each information terminal 102, for example, and the interactive whiteboard 101 may identify the user who inputs the image data by considering the variation of the radio wave strength from each information terminal 102. For example, if there is no significant difference between the strength of the radio wave from the information terminal 102-1 and the strength of the radio wave from the information terminal 102-3 during the time period from the time T5 to the time T6, the interactive whiteboard 101 can determine the user of the information terminal 102-3 with the large variation in the radio wave strength as the person who makes the input 3.

It is described, in the description of FIG. 1 that the communication range 104 of the short radio communication unit of the interactive whiteboard 101 may preferably be made in front of the interactive whiteboard 101. However, this is only a preferably example, and the embodiments of the preset invention is not limited to this. For example, as illustrated in FIG. 22, the communication range 104 of the short range radio communication unit of the interactive whiteboard 101 may be a communication range 2101 having a shape of a concentric circle. Here, the center of the concentric circle may be at the location of the interactive whiteboard 101.

In the above-described embodiments, the configuration is described for a case where the image data is detected and stored, which image data is input by a user by using, for example, the touch panel of the interactive whiteboard 101. However, this configuration is for exemplifying purposes only. For example, the embodiments of the present invention can be applied to a case where the image data input by a user is detected and stored by detecting an instruction with respect to a projected image by using a camera installed in a short focus projector.

Further Embodiment

In this embodiment, an example is described in which the present invention is applied to an image forming apparatus.

<System Configuration>

Figure 23:
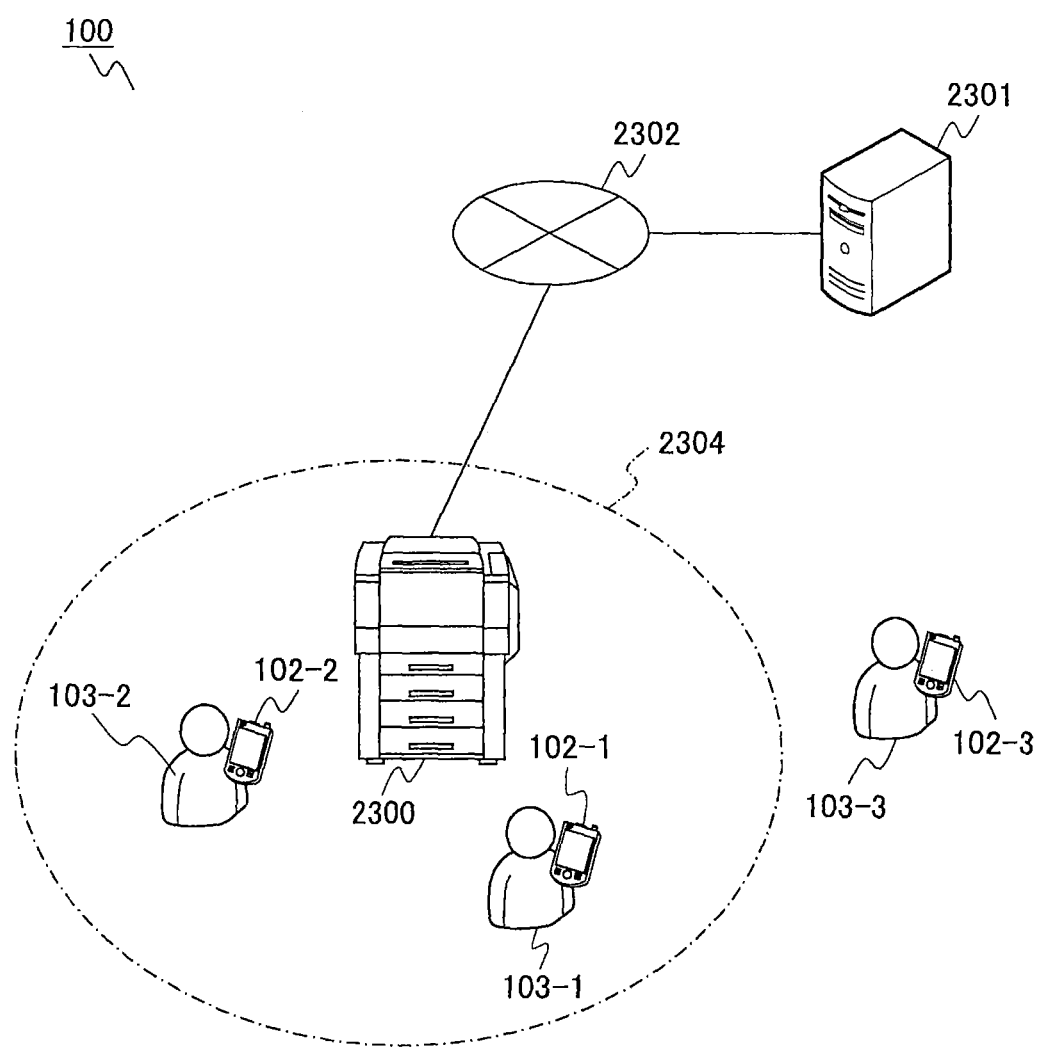
FIG. 23 is a diagram illustrating an example of a configuration of the image processing system according to a further embodiment.

FIG. 23 is a diagram illustrating an example of a configuration of an image processing system according to the further embodiment. The image processing system (information processing system) 100 may include an image forming apparatus 2300; and the information terminals 102-1 to 102-3 that are held (carried) by the plurality of users 103-1 to 103-3, respectively. Further, in FIG. 23, the image forming apparatus 2300 is connected to a network 2302, such as the Internet or a local area network (LAN). The image forming apparatus 2300 can execute communication with one or more external servers 2301, such as an authentication server and a print server, via the network 2302.

The image forming apparatus 2300 may be a multifunction peripheral (MFP) having functions, such as a printer function, a scanner function, a copier function, and a facsimile function; or an image forming apparatus, such as a printer. The image forming apparatus 2300 is an example of an information processing device according to the embodiment.

Similar to the above-described embodiments, the information terminals 102-1 to 102-3 are portable information terminals (mobile terminals) owned by the users 103-1 to 103-3, respectively, such as a smartphone, a tablet terminal, a smart watch, and a smart glass.

The image forming apparatus 2300 includes, for example, a short range radio communication unit based on the BLE. The image forming apparatus 2300 receives radio waves from the information terminals 102-1 to 102-3 within a communication area of the short range radio communication unit. Then, the image forming apparatus 2300 obtains, from the received radio waves, the output terminal identification information, which is the information for identifying the information terminals 102-1 to 102-3, for example. Note that the output terminal identification information is an example of the operator identification information, which is the information for identifying a user holding the information terminal 102. The operator identification information can be another type of information (e.g., an identification number of the operator, or a phone number), as long as the user holding the information terminal 102 can be identified with the information.

Further, the image forming apparatus 2300 measures the strength levels of the radio waves received from the information terminals 102-1 to 102-3, and the image forming apparatus 2300 detects that the information terminals 102-1 and 102-2 are in the vicinity 2304 of the image forming apparatus 2300 (e.g., a range such that the distance from the image forming apparatus 2300 is less than or equal to 50 cm).

Optionally, the image forming apparatus 2300 creates, in advance, a correspondence table that defines a correspondence between received radio wave strength and a distance as described below, so as to determine, based on the received radio wave strength, a distance between the image forming apparatus 2300 and each of the information terminals 102-1 to 102-3. First, the operating mode of the image forming apparatus 2300 is switched to an operating mode for creating the correspondence table between the received radio wave strength and a distance. Here, a user inputs "distance=50 cm" in the image forming apparatus 2300. At this time, the power supply of the information terminal 102 is turned off. Then, the information terminal 102 is placed at a position, so that the distance between the image forming apparatus 2300 and the information terminal 102 is 50 cm, and the user presses a start button of the image forming apparatus 2300, and the user turns on the power supply of the information terminal 102. Then, the information terminal 102 transmits an advertisement packet, while including transmission power of the radio wave in the advertisement packet. The image forming apparatus 2300 associates the strength of the radio wave received from the information terminal 102 and the transmission power that is obtained from the advertisement packet with "distance=50 cm," and stores the strength of the radio wave, the transmission power, and the associated distance. Subsequently, the user inputs "distance=1 m" in the image forming apparatus 2300, and the process similar to the above-described process is executed. In this manner, for each of a plurality of distances, the image forming apparatus 2300 associates the strength of the radio wave received from the information terminal 102 and the transmission power that is obtained from the advertisement packet with the distance, and stores the strength of the radio wave, the transmission power, and the associated distance. Here, the information terminal 102 is configured so that the information terminal 102 can variably set the transmission power of the radio wave.

Each of the information terminals 102-1 to 102-3 transmits an advertisement packet, while including information indicating transmission power of the radio wave in the advertisement packet. The image forming apparatus 2300 measures the strength of the radio wave received from each of the information terminals 102-1 to 102-3; and the image forming apparatus 2300 determines, based on the measured strength of the radio wave and the information indicating the transmission power that is obtained from the advertisement packet, a distance between the image forming apparatus 2300 and each of the information terminals 102-1 to 102-3 by referring to a correspondence table, which is shown below. Then, the image forming apparatus 2300 determines whether any of the information terminals 102-1 to 102-3 is located in the vicinity 2304 of the image forming apparatus 2300 (e.g., a range such that a distance from the image forming apparatus 2300 is less than or equal to 50 cm).

| Correspondence table | | |
|---|---|---|
| Distance (m) | Transmission power (mW) | Received radio wave strength (dBm) |
| 0.5 | 8 | −40 |
| 1 | 8 | −52 |
| 1.5 | 8 | −60 |
| 2 | 8 | −68 |

Note that the above-described distance 50 cm is an example of a distance for determining whether a location is within the vicinity 2304 of the image forming apparatus 2300. The distance for determining whether a location is within the vicinity 2304 of the image forming apparatus 2300 can be another distance (e.g., 1 m, 1.5 m, 2 m, . . . , etc.).

The image forming apparatus 2300 according to the embodiment determines the users holding the information terminals 102-1 and 102-2 in the vicinity 2304 of the image forming apparatus 2300 as the users with a high likelihood of using the image forming apparatus 2300 (which is referred to as user candidates). Additionally, the image forming apparatus 2300 executes advance authentication of the user candidates based on the operator identification information that is obtained from the information terminals 102-1 and 102-2 in the vicinity 2304 of the image forming apparatus 2300.

The image forming apparatus 2300 determines that the user 103-1 is the operator of the image forming apparatus 2300, upon detecting that the strength of the radio wave received from the information terminal 102-1 reaches the radio wave strength stored in advance (the first radio wave strength), as the user 103-1 moves to a position in front of the operation panel of the image forming apparatus 2300. In this case, the image forming apparatus 2300 may allow the user 103-1 to log in to the image forming apparatus 2300 without waiting for the authentication process because the authentication process of the user 103-1 is executed in advance. For example, the image forming apparatus 2300 executes an image forming process corresponding to the operation (instruction) of the user 103-1 by displaying, for example, on the operation panel, an operation screen for a logged-in user, i.e., the user 103-1, who is allowed to log in to the image forming apparatus 2300.

<Hardware Configuration>

Figure 24:
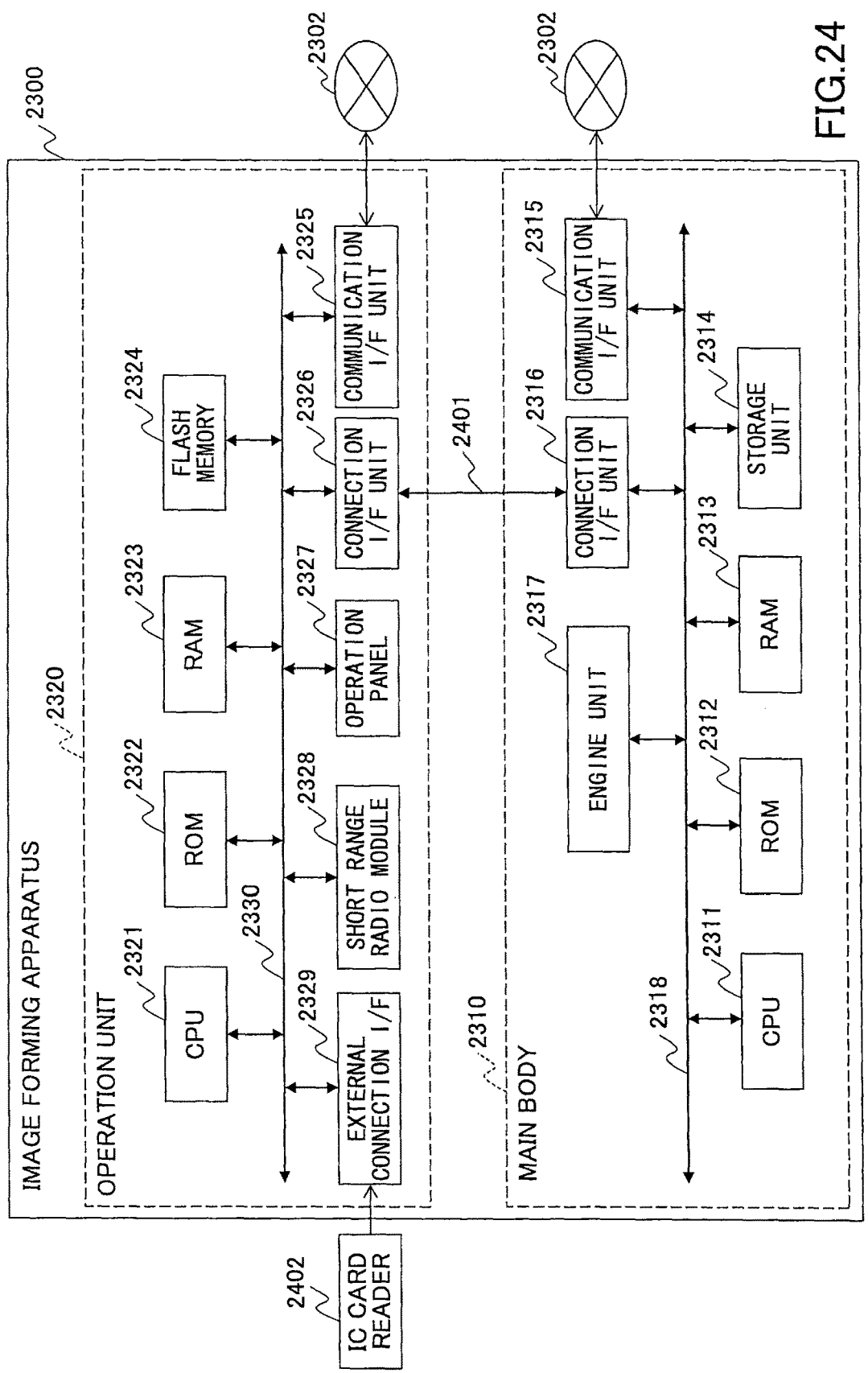
FIG. 24 is a diagram illustrating an example of a hardware configuration of an image forming device according to the further embodiment.

FIG. 24 is a hardware configuration of the image forming apparatus 2300 according to the embodiment. The image forming apparatus 2300 includes, for example, a main body 2310 that implements the image forming function; and an operation unit 2320 that receives an operation of a user. The main body 2310 and the operation unit 2320 are connected through a dedicated communication line 2401, so that the main body 2310 and the operation unit 2320 can mutually communicate.

First, a hardware configuration of the main body 2310 is described. As shown in FIG. 24, the main body 2310 includes, for example, a CPU 2311; a ROM 2312; a RAM 2313; a storage unit 2314; a communication I/F unit 2315; a connection I/F unit 2316; an engine unit 2317; and a system bus 2318.

The CPU 2311 centrally controls operations of the main body 2310. The CPU 2311 controls overall operation of the main body 2310 by executing one or more programs stored in the ROM 2312 or in the storage unit 2314 by using the RAM 2313 as a work area.

The ROM 2312 is a non-volatile memory for storing, for example, a Basic Input/Output System (BIOS) that is to be executed during activation of the main body 2310, and various types of settings. The RAM 2313 is a volatile memory that is used as a work area of the CPU 2311. The storage unit 2314 is a non-volatile storage device for storing, for example, an OS, an application program, and various types of data. The storage unit 2314 may be formed of a HDD, or a SSD, for example.

The communication I/F unit 2315 is a network interface for connecting the main body 2310 to the network 2302; and the communication I/F unit 2315 is the network interface for the main body 2310 to communicate with one or more external servers 2301 that are connected to the network 2302.

The connection I/F 2316 is an interface of the main body 2310 to communicate with the operation unit 2320 through the communication line 2401.

The engine unit 2317 is a hardware component for implementing image forming functions, such as a copy function, a scanner function, a facsimile function, and a printer function. The engine unit 2317 includes, for example a scanner to scan and read an image of a document; a plotter to print on a sheet material, such as a paper sheet; and a facsimile to execute facsimile communication.

The system bus 2318 is connected to each of the above-described components, and the system bus 2318 transmits address signals, data signals, and various types of control signals.

Next, a hardware configuration of the operation unit 2320 is described. As illustrated in FIG. 24, the operation unit 2320 includes, for example, a CPU 2321; a ROM 2322; a RAM 2323; a flash memory 2324; a communication I/F 2325; a connection I/F 2326; an operation panel 2327; a short range radio module 2328; an external connection I/F 2329; and a system bus 2330.

The CPU 2321 centrally controls operations of the operation unit 2320. The CPU 2321 controls overall operation of the operation unit 2320 by executing one or more programs stored in the ROM 2322 or the flash memory 2324 by using the RAM 2323 as a work area.

The ROM 2322 is a non-volatile memory for storing, for example, the BIOS that is to be executed during activation of the operation unit 2320, and various types of settings. The RAM 2323 is a volatile memory that is used as a work area of the CPU 2321. The flash memory 2324 is a non-volatile storage device that stores, for example, an OS, an application program, and various types of data.

The communication I/F 2325 is a network interface for connecting the operation unit 2320 to the network 2302. The communication I/F 2325 is the network interface for the operation unit 2320 to communicate with one or more external servers 2301 that are connected to the network 2302.

The connection I/F 2326 is an interface of the operation unit 2320 to communicate with the main body 2310 through the communication line 2401.

The operation panel 2327 receives various types of inputs corresponding to operations of a user, and at the same time, the operation panel 2327 displays various types of information. The operation panel 2327 is formed of, for example, a liquid crystal display (LCD) device in which a touch panel function is installed. However, the operation panel 2327 is not limited to this. The operation panel 2327 may be formed of, for example, an organic electro luminescence (EL) display device in which a touch panel function is installed. Alternatively or additionally, the operation panel 2327 may include an operation unit, such as hardware keys; and a display unit, such as a lamp.

The short range radio module 2328 is a short range radio device (e.g., a Bluetooth module) that executes communication with the information terminal 102 located within a predetermined communication range by the short range communication (e.g., communication based on the BLE).

The external connection I/F 2329 is an interface (e.g., an interface based on the USB standard) for connecting the operation unit 2320 to an external device. In FIG. 24, an IC card reader 2402 is connected to the external connection I/F 2329. Note that the IC card reader 2402 is an example of an external device.

The system bus 2330 is connected to the above-described components, and the system bus 2330 transmits address signals, data signals, and various types of control signals.

<Functional Configuration>

Figure 25:
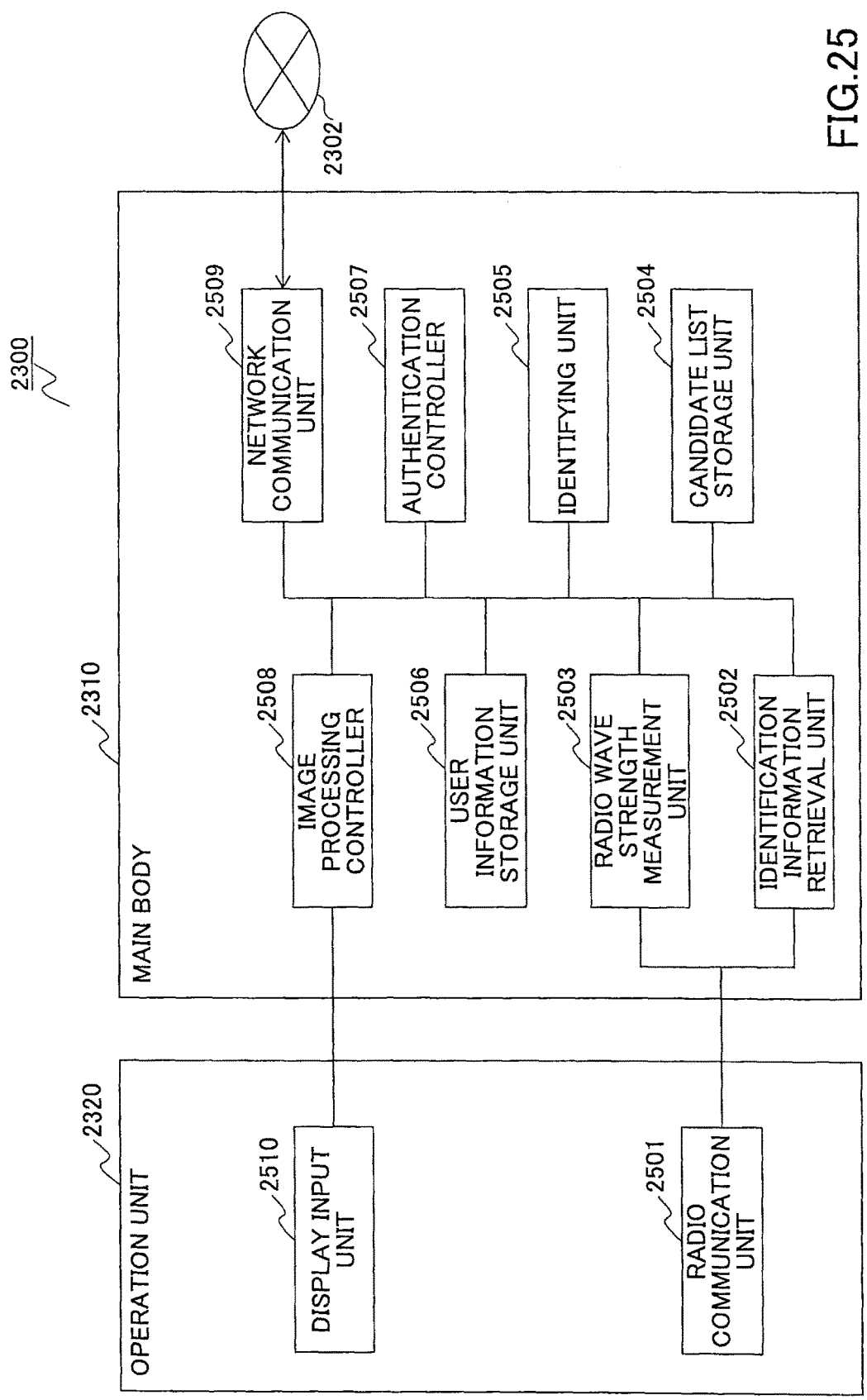
FIG. 25 is a diagram illustrating an example of a hardware configuration of the image forming device according to the further embodiment.

FIG. 25 is a functional configuration diagram of the image forming apparatus 2300 according to the embodiment. The image forming apparatus 2300 includes, for example, a radio communication unit 2501; an identification information retrieval unit 2502; a radio wave strength measurement unit 2503; a candidate list storage unit 2504; an identifying unit 2505; a user information storage unit 2506; an authentication controller 2507; an image processing controller 2508; a network communication unit 2509; and a display input unit 2510.

In FIG. 25, the operation unit 2320 includes the radio communication unit 2501 and the display input unit 2510. However, at least a part of the components other than the image processing controller 2508 that is included in the main body 2310 may be included in the operation unit 2320.

The radio communication unit (receiver) 2501 receives radio waves that are output from one or more information terminals (mobile terminals) 102 within a communication range by the short range radio communication based on, for example, the BLE. Further, the radio communication unit 2501 transmits information by the short range radio communication, and the radio communication unit 2501 executes communication control. The radio communication unit 2501 can be implemented, for example by the short range radio module 2328 of FIG. 24, and one or more programs executed by the CPU 2321 of FIG. 24.

The identification information retrieval unit (retrieval unit) 2502 obtains, for each of the radio waves received by the radio communication unit 2501, operator identification information (e.g., the output terminal identification information) for identifying a user (operator) holding (carrying) the information terminal 102 that outputs the radio wave. The identification information retrieval unit 2502 can be implemented, for example, by the CPU 2311 or one or more programs executed by the CPU 2311. Here, the output terminal identification information is an example of the operator identification information. The operator identification information may be another type of information (e.g., an operator identification number, or a telephone number), as long as the user holding the information terminal 102 that outputs the radio wave can be identified by the information.

The radio wave strength measurement unit (measurement unit) 2503 measures strength of the radio waves received by the radio communication unit 2501. The radio wave strength measurement unit 2503 can be implemented, for example, by the short range radio module 2328 of FIG. 4, and the CPU 2311 or one or more programs executed by the CPU 2321.

The candidate list storage unit (first storage unit) 2504 stores a candidate list which stores, for each output terminal identification information that is obtained by the identification information retrieval unit 2502, the strength of the radio wave measured by the radio wave strength measurement unit 2503. The candidate list storage unit 2504 can be implemented, for example, by the RAM 2313 and the storage unit 2314 of FIG. 24, and one or more programs executed by the CPU 2311 of FIG. 24. Alternatively, the candidate list storage unit 2504 may be implemented, for example, by the RAM 2323 and the flash memory 2324 of FIG. 24, and one or more programs executed by the CPU 2321 of FIG. 24. The candidate list is described below.

The identifying unit 2505 identifies, based on the strength of the radio wave of each operator identification information that is stored in the candidate list storage unit 2504, the operator identification information that is output by the information terminal 102 that is held by the user (operator) who operates (instructs) the image forming apparatus 2300, for example. The identifying unit 2505 can be implemented, for example, by the CPU 2311 of FIG. 24, or one or more programs executed by the CPU 2321.

The user information storage unit (the second storage unit) 2506 is a storage unit that pre-stores the information of the users of the image forming apparatus 2300 (user information). The user information storage unit 2506 can be implemented, for example, by the storage unit 2314 of FIG. 24, and one or more programs executed by the CPU 2311 of FIG. 24.

FIG. 26A illustrates an example of the user information stored in the user information storage unit 2506. In the example of FIG. 26A, the user information includes the output terminal identification information, the operator identification information, first radio wave strength, and second radio wave strength, for example.

The output terminal identification information is the identification information for identifying the information terminal 102. The operator identification information is the identification information for identifying a user (operator). The output terminal identification information and the operator identification information are an example of the operator identification information for identifying a user (operator) holding (carrying) the information terminal 102.

The first radio wave strength is information indicating the strength of the radio wave measured by the radio wave strength measurement unit 2503, in response to detecting, for example, that the user holding the information terminal 102 instructs the image forming apparatus 2300 (e.g., by inputting a command). The first radio wave strength may be, for example, the information that is obtained by measuring and registering, upon detecting that the user holding the information terminal 102 operates the image forming apparatus 2300, the strength of the radio wave from the information terminal 102 that is held by the user, similar to the above-described embodiment. Alternatively, the first radio wave strength may be obtained by measuring and registering, upon detecting that the distance between the information terminal 102 and the image forming apparatus 2300 is within a predetermined range (e.g., 0 cm to 20 cm), the strength of the radio wave from the information terminal 102. Additionally, the first radio wave strength may be a predetermined value that is commonly defined for the plurality of information terminals 102, or a predetermined value that is defined for each type of the information terminal 102.

In the embodiment, the identifying unit 2505 determines, upon detecting that the strength of the radio wave received from the information terminal 102 reaches the first radio wave strength of the information terminal 102, that the user of the information terminal 102 is the user who operates the image forming apparatus 2300. For example, upon detecting that the strength of the radio wave of the information terminal 102 with the output terminal identification information "aaa" in FIG. 26A is greater than or equal to 2.5 mW, the identifying unit 2505 determines that the user with the operator identification information "USER A" is the user operating the image forming apparatus 2300.

The second radio wave strength is the information indicating the strength of the radio wave measured by the radio strength measurement unit 2503, upon detecting, for example, that the information terminal 102 enters the vicinity 2304 of the image forming apparatus 2300 (e.g., the distance from the image forming apparatus 2300 is less than or equal to 1 m). Similar to the first radio wave strength, the second radio wave strength may be the information obtained by actually measuring and registering the strength of the radio wave received from the information terminal 102. Alternatively, the second radio wave strength may be, for example, a value that is calculated from a ratio (or a difference) between the second radio wave strength and the first radio wave strength by using the first radio wave strength. Additionally, the second radio wave strength may be a predetermined value that is commonly defined for the plurality of information terminals 102, or a predefined value that is defined for each device type of the information terminal 102.

In the embodiment, the identifying unit 2505 determines, in response to detecting that the strength of the radio wave received from the information terminal 102 is greater than or equal to the second radio wave strength of the information terminal 102, that the information terminal 102 is in the vicinity 2304 of the image forming apparatus 2300.

Referring back to FIG. 25, the description of the functional configuration of the image forming apparatus 2300 is continued.

The authentication controller 2507 executes an authentication process for a user who uses the image forming apparatus 2300. The authentication controller 2507 according to the embodiment executes an advance authentication process for the user based on the operator identification information obtained from the information terminal 102. Here, a determination is made that the information terminal 102 is located in the vicinity of the image forming apparatus 2300.

For example, the authentication controller 2507 requests to authenticate the user by transmitting, to the external server 2301 (the authentication server), an authentication request including the operator identification information (the output terminal identification information, or the operator identification information) that is obtained from the information terminal 102 located in the vicinity 2304 of the image forming apparatus 2300. Further, as another example, the authentication controller 2507 may execute the authentication process within own device by determining whether the operator identification information that is obtained from the information terminal 102 in the vicinity 2304 of the image forming apparatus 2300 is stored in the user information storage unit 2506.

The image processing controller 2508 executes various types of control of an image forming process by the image forming apparatus 2300. For example, the image processing controller 2508 displays, on the display input unit 2510, an operation screen for a logged-in user corresponding to the user who is allowed to log in. In response to an operation (instruction) by the user, the image processing controller 2508 executes an image forming process by using the engine unit 2317 of FIG. 24. The image processing controller 2508 can be implemented, for example, by one or more programs executed by the CPU 2311 of FIG. 24.

The network communication unit 2509 executes communication with the external server 2301 that is connected to the image forming apparatus 2300 through the network 2302 by using the communication I/F unit 2315 or the communication I/F 2325 of FIG. 24, for example. The network communication unit 2509 can be implemented by one or more programs executed by the CPU 2311 or the CPU 2321 of FIG. 24, for example.

The display input unit 2510 displays, for example, the operation screen of the image forming apparatus 2300 on the operation panel 2327 of FIG. 24, and the display input unit 2510 receives an operation (instruction) input by a user. The display input unit 2510 can be implemented, for example, by one or more programs executed by the CPU 2321 of FIG. 24.

<Flow of the Process>

Subsequently, the flow of the process by the image forming apparatus 2300 according to the embodiment is described.

(Candidate List Updating Process)

Figure 27A:
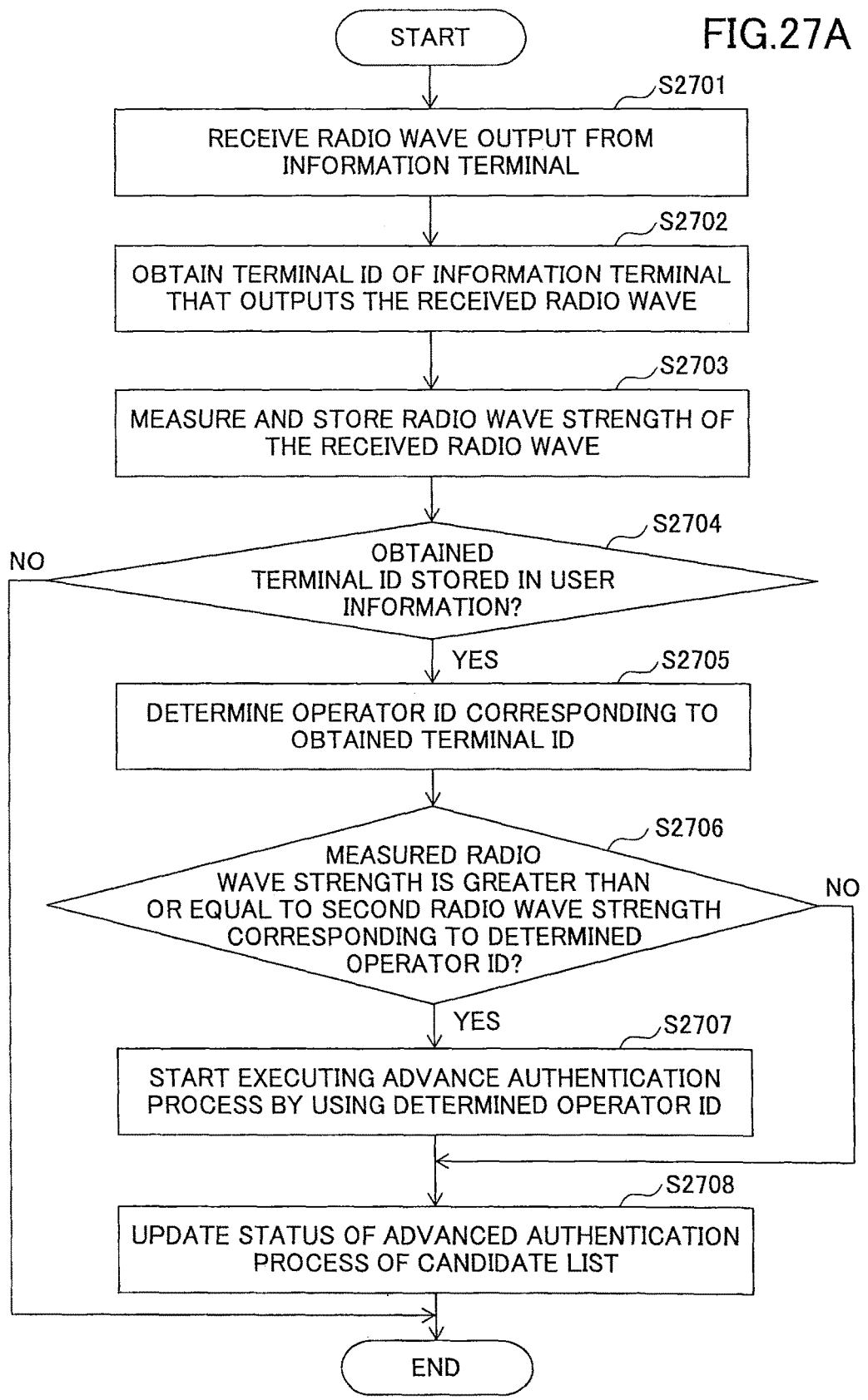

FIGS. 27A and 27B are flowcharts illustrating examples of the process of updating the candidate list according to the embodiment.

FIG. 27A illustrates an example of the process of updating the candidate list. The image forming apparatus 2300 updates the candidate list that is stored in the candidate list storage unit 2504 by repeatedly executing the process of updating the candidate list that is shown in FIG. 27A or FIG. 28B at predetermined time intervals, for example.

At step S2701, the radio communication unit 2501 of the image forming apparatus 2300 receives one or more radio waves output from the one or more information terminals 102 that are located within a communication range of the radio communication unit 2501.

At step S2702, the identification information retrieval unit 2502 of the image forming apparatus 2300 obtains, from each of the radio waves received by the radio communication unit 2501, the output terminal identification information of the information terminal 102 that outputs the radio wave (which is referred to as the terminal ID, hereinafter). Here, the terminal ID is an example of the operator identification information that is the information for identifying the user (operator) holding (carrying) the information terminal 102 that outputs the radio wave.

At step S2703, the radio wave strength measurement unit 2503 of the image forming apparatus 2300 measures the strength of each of the radio waves received by the radio communication unit 2501. The radio wave strength that is measured by the radio wave strength measurement unit 2503 is stored in the candidate list that is stored in the candidate list storage unit 2504 for each of the terminal IDs obtained by the identification information retrieval unit 250, for example.

FIG. 26B illustrates an example of the candidate list that is stored in the candidate list storage unit 2504. In the example of FIG. 26B, the candidate list includes information items, such as the output terminal identification information, the operator identification information, the received radio wave strength, and an advance authentication process status.

The output terminal identification information is the identification information (the terminal ID) for identifying the information terminal 102. The operator identification information is the identification information for identifying a user (operator) (which is referred to as the operator ID, hereinafter). The output terminal identification information and the operator identification information are an example of the operator identification information for identifying the user (operator) holding (carrying) the information terminal 102.

The received radio wave strength is the information indicating the strength of the radio wave measured by the radio wave strength measurement unit 2503 at step S2703.

As shown in FIG. 26B, the candidate list that is stored in the candidate list storage unit 2504 stores, for each terminal ID obtained by the identification information retrieval unit 2502, the strength of the radio wave measured by the radio wave strength measurement unit 2503. Further, the candidate list that is stored in the candidate list storage unit 2504 includes the user information that is illustrated in FIG. 16A, such as the output terminal identification information "ccc" in FIG. 26B; and the candidate list may include information on a terminal ID for which the radio wave strength is not measured. In the example of FIG. 26B, "0" is stored as the received radio wave strength corresponding to the output terminal identification information "ccc" for which the radio wave strength is not measured.

At step S2704 of FIG. 27, the authentication controller 2507 of the image forming apparatus 2300 determines, for each terminal ID that is obtained by the identification information retrieval unit 2502, whether the terminal ID is stored in the user information that is stored in the user information storage unit 2506.

Further, the authentication controller 2507 executes, for each terminal ID for which a determination is made that the terminal ID is stored in the user information that is stored in the user information storage unit 2506, the process on and after step S2705.

Whereas, the authentication controller 2507 does not executes, for each terminal ID for which a determination is made that the terminal ID is not stored in the user information that is stored in the user information storage unit 2506, the process on and after step S2705.

At step S2705, the authentication controller 2507 of the image forming apparatus 2300 determines the operator ID corresponding to the terminal ID that is obtained by the identification information retrieval unit 2502. For example, the authentication controller 2507 can determine (obtain) the operator ID (the operator identification information) corresponding to the terminal ID (the output terminal identification information) by the user information illustrated in FIG. 26A. Note that, if the operator identification information that is obtained by the identification information retrieval unit 2502 is the operator ID, the process at step S1705 can be omitted.

At step S2706, the authentication controller 2507 determines whether the strength of the radio wave corresponding to the terminal ID obtained by the identification information retrieval unit 2502 is greater than or equal to the second radio wave strength corresponding to the operator ID that is determined at step S2705. By this process, the authentication controller 2507 can determine whether the information terminal 102 corresponding to the terminal ID obtained by the identification information retrieval unit 2502 is in the vicinity 2304 of the image forming apparatus 2300.

In response to determining that the strength of the radio wave corresponding to the terminal ID obtained by the identification information retrieval unit 2502 is greater than or equal to the second radio wave strength that corresponds to the operator ID that is determined at step S2705, the process of the authentication controller 2507 proceeds to step S2707.

Whereas, in response to determining that the strength of the radio wave corresponding to the terminal ID obtained by the identification information retrieval unit 2502 is less than the second radio wave strength that corresponds to the operator ID that is determined at step S2705, the process of the authentication controller 2507 proceeds to step S2708.

At step S2707, the authentication controller 2507 starts executing an advance authentication process, which is for executing a user authentication in advance, by using the operator ID that is determined at step S2705. Here, if it is determined that the advance authentication process corresponding to the operator ID that is determined at step S2705 is already started or already completed, the authentication controller 2507 maintains the current state of the advance authentication process. The advance authentication process is described below.

At step S2708, the authentication controller 2507 updates the information on the "state of the advance authentication process" of the candidate list that is stored in the candidate list storage unit 2504. For example, in the candidate list that is illustrated in FIG. 26B, the "state of the advance authentication process" corresponding to the "operator identification information (operator ID)" for which the advance authentication process is started at step S2707 is updated to be "executed."

By the above-described process, the advance authentication process is executed for the output terminal identification information (terminal ID) of "aaa" and "ddd" because the received radio wave strength corresponding to the output terminal identification information "aaa" reaches the second radio wave strength stored in FIG. 26A, and the received radio wave strength corresponding to the output terminal identification information "ddd" reaches the second radio wave strength stored in FIG. 26A. Additionally, in FIG. 26B, the "state of the advance authentication process" corresponding to the output terminal identification information (terminal ID) "aaa" is "executed," and the "state of the advance authentication process" corresponding to the output terminal identification information (terminal ID) "ddd" is "executed."

FIG. 27B illustrates another example of the process of updating the candidate list. Here, in the process of updating the candidate list illustrated in FIG. 27B, the process from step S2701 to step S2704 is the same as the process of updating the candidate list illustrated in FIG. 27A. Thus, the differences from FIG. 27A are mainly described.

The authentication controller 2507 of the image forming apparatus executes, for each terminal ID for which a determination is made that the terminal ID is stored in the user information that is stored in the user information storage unit 2506 at step S2704, the process on and after step S2711.

At step S2711, the authentication controller 2507 determines whether the strength of the radio wave corresponding to the terminal ID that is obtained by the identification information retrieval unit 2502 is greater than or equal to the second radio wave strength corresponding to the same terminal ID. By this process, the authentication controller 2507 can determine whether the information terminal 102 corresponding to the terminal ID obtained by the identification information retrieval unit 2502 is in the vicinity 2304 of the image forming apparatus 2300.

In response to determining that the strength of the radio wave corresponding to the terminal ID obtained by the identification information retrieval unit 2502 is greater than or equal to the second radio wave strength corresponding to the same terminal ID, the process of the authentication controller 2507 proceeds to step S2707.

Whereas, in response to determining that the strength of the radio wave corresponding to the terminal ID obtained by the identification information retrieval unit 2502 is less than the second radio wave strength corresponding to the same terminal ID, the process of the authentication controller 2507 proceeds to step S2713.

At step S2712, the authentication controller 2507 starts executing the advance authentication process, which is for executing user authentication in advance, by using the terminal ID that is obtained by the identification information retrieval unit 2502. The advance authentication process is described below.

At step S2713, the authentication controller 2507 updates the information on the "state of the advance authentication process" of the candidate list stored in the candidate list storage unit 2504. For example, in the candidate list illustrated in FIG. 26B, the "state of the advance authentication process" corresponding to the "output terminal identification information (terminal ID)" for which the advance authentication process is started at step S2707 is updated to be "executed."

In this manner, the authentication controller 2507 of the image forming apparatus 2300 executes the advance authentication process of the user by using the operator ID or the terminal ID corresponding to the information terminal 102 in the vicinity 2304 of the image forming apparatus 2300, and the authentication controller 2507 stores the status of the advance authentication process in the candidate list.

(Process of Identifying the Operator)

FIG. 28 is a flowchart illustrating an example of a process of identifying an operator according to the embodiment.

At step S2801, for example, after the process of updating the candidate list that is shown in FIG. 27 is executed, the image forming apparatus 2300 executes the process on and after step S2802.

As another example, the image forming apparatus 2300 may executes the process on and after step S2802 of FIG. 28 in parallel with the process of updating the candidate list that is shown in FIG. 27.

At step S2802, the identifying unit 2505 of the image forming apparatus 2300 determines, by using the candidate list that is stored in the candidate list storage unit 2504, whether the strength of the radio wave of the output terminal identification information (terminal ID) is changed, for which the status of the advance authentication process is "executed."

In response to determining that the strength of the radio wave is changed for the terminal ID for which the status of the advance authentication process is "executed," the image forming apparatus 2300 executes the process on and after step S2803, for each terminal ID for which the strength of the radio wave is changed, among the terminal IDs for which the status of the advance authentication process is "executed."

Whereas, in response to determining that the strength of the radio wave is not changed for the terminal ID for which the status of the advance authentication process is "executed," the image forming apparatus 2300 ends the process of updating the candidate list.

At step S2803, the identifying unit 2505 of the image forming apparatus 2300 determines whether the received radio wave strength corresponding to the terminal ID for which a determination is made that the strength of the radio wave is changed at step S2802 is greater than or equal to the first radio wave strength of the terminal ID.

In response to determining that the received radio wave strength corresponding to the terminal ID for which a determination is made that the radio wave strength is changed is greater than or equal to the first radio wave strength of the terminal ID, the process of the identifying unit 2505 proceeds to step S2804.

Whereas, in response to determining that the received radio wave strength corresponding to the terminal ID for which a determination is made that the radio wave strength is changed is less than the first radio wave strength of the terminal ID, the process of the identifying unit 2505 proceeds to step S2808.

At step S2804, the identifying unit 2505 identifies the terminal ID for which the received radio wave strength is greater than or equal to the first radio wave strength, and the identifying unit 2505 determines that the user corresponding to the identified terminal ID is the operator of the image forming apparatus 2300.

For example, suppose that, in the candidate list of FIG. 26B, the received radio wave strength corresponding to the output terminal identification information "aaa" is greater than or equal to 2.5 mW, which is the value of the first radio wave strength corresponding to the output terminal identification information "aaa" in FIG. 26A. In this case, the identifying unit 2505 identifies the output terminal identification information "aaa" for which the received radio wave strength is greater than or equal to the first radio wave strength, and the identifying unit 2505 determines that the user with the operator identification information "USER A" corresponding to the identified output terminal identification information "aaa" is the operator of the image forming apparatus 2300.

At step S2805, the authentication controller 2507 of the image forming apparatus 2300 interrupts execution of the advance authentication process of the users other than the user who is determined as the operator of the image forming apparatus 2300 at step S2804. Further, the authentication controller 2507 updates, in the candidate list that is stored in the candidate list storage unit 2504, the status of the advance authentication process corresponding to the users to whom the advance authentication process is interrupted to be "not executed."

Here, the process at step S2805 may be omitted. For example, instead of the process at step S2905, the authentication controller 2507 may interrupt execution of the advance authentication process for which a predetermined time period elapses after the status of the advance authentication process is changed to "executed."

At step S2806, the authentication controller 2507 completes the authentication process of the user who is determined as the operator of the image forming apparatus 2300 at step S2804, and the authentication controller 2507 allows the user to log in to the image forming apparatus 2300.

At step S2807, the image processing controller 2508 and the display input unit 2510 displays, for the user who is determined as the operator of the image processing apparatus 2300, the operation screen for the logged-in user on the operation panel 2327.

Subsequently, a process is described for a case where a determination is made, at step S2803, that the received radio wave strength of the terminal ID is less than the first radio wave strength of the same terminal ID, for which the determination is made that radio wave strength is changed.

At step S2808, the identifying unit 2505 of the image forming apparatus 2300 determines whether the received radio wave strength corresponding to the terminal ID is less than the second radio wave strength of the same terminal ID, for which the determination is made, at step S2802, that the radio wave strength is changed.

In response to determining that the received radio wave strength corresponding to the terminal ID is greater than or equal to the second radio wave strength of the same terminal ID, for which the determination is made that the radio wave strength is changed, the image forming apparatus 2300 ends the process of identifying the operator.

Whereas, in response to determining that the received radio wave strength corresponding to the terminal ID is less than the second radio wave strength of the same terminal ID, for which the determination is made that the radio wave strength is changed, the process of the authentication controller 2507 of the image forming apparatus 2300 proceeds to step S2809.

At step S2809, the authentication controller 2507 of the image forming apparatus 2300 interrupts execution of the advance authentication process of the user corresponding to the terminal ID for which the measured radio wave strength (the received radio wave strength) is less than the second radio wave strength. Additionally, the authentication controller 2507 updates, in the candidate list that is stored in the candidate list storage unit 2504, the status of the advance authentication process to be "not executed," for the user to whom the advance authentication process is interrupted.

Here, the process at step S2809 may be omitted. For example, instead of the process at step S2809, the authentication controller 2507 may interrupt the advance authentication process for which a predetermined time period elapses after the status of the advance authentication process is changed to "executed."

By the above-described process, the image forming apparatus 2300 can determine that the user of the information terminal 102 for which the received radio wave strength, which is received from the information terminal 102, is greater than or equal to the first radio wave strength is the operator of the image forming apparatus 2300, and the image forming apparatus 2300 can execute a process for the operator.

(Advance Authentication Process)

Subsequently, a specific example of the advance authentication process is described.

Figure 29:
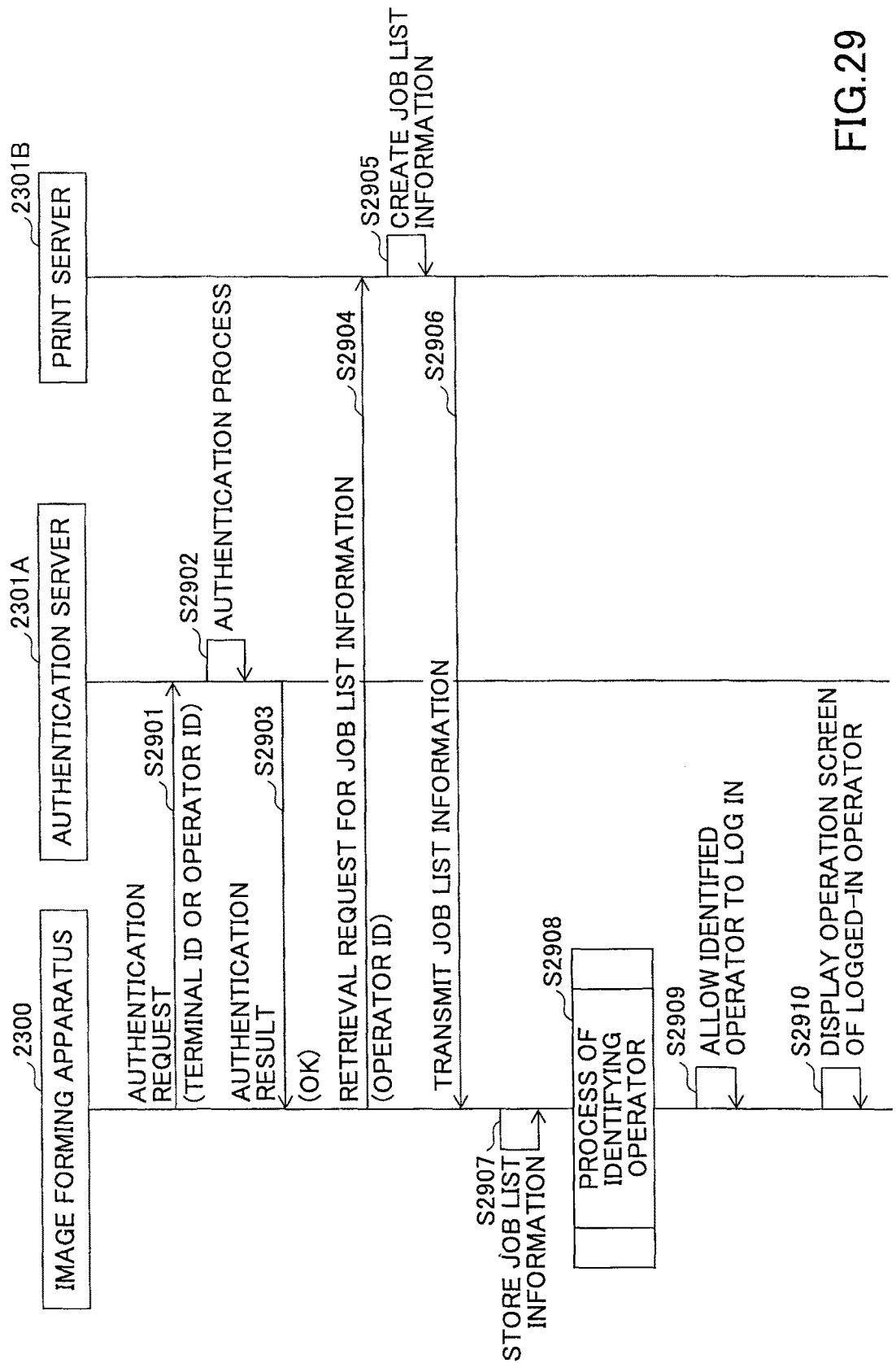
FIG. 29 is a sequence chart illustrating an example of a prior authentication process according to the further embodiment.

FIG. 29 is a sequence chart illustrating an example of the advance authentication process according to the embodiment. In the example of FIG. 29, it is assumed that the image forming apparatus 2300 can execute communication with an authentication server 2301A and a print server 2301B, as the one or more external servers 2301.

The authentication server 2301A is a server apparatus for executing authentication of a user of the image forming apparatus 2300, in response to an authentication request from the image forming apparatus 2300. The print server 2301B is a server apparatus that stores print jobs of the user of the image forming apparatus 2300.

At step S2901, upon starting the advance authentication process, the authentication controller 2507 of the image forming apparatus 2300 transmits an authentication request to the authentication server 2301A to request an authentication of the user. The authentication request includes the operator identification information, such as the operator ID (the operator identification information) that is determined at step S2705 of FIG. 27A, or the terminal ID (the output terminal identification information) for which the determination is made, at step S2704 of FIG. 27B, that the terminal ID is stored in the user information.

At step S2902, the authentication server 2301A executes authentication of the operator ID that is included in the authentication request that is receive from the image forming apparatus 2300, or authentication of the operator identification information, such as the terminal ID.

At step S2903, the authentication server 2301A transmits, to the image forming apparatus 2300, which is the request source, an authentication result of the operator identification information for which the authentication process is executed. The authentication result that is transmitted from the authentication server 2301A includes, for example, information indicating whether the authentication is "OK" (allowed) or "NG" (denied). Further, if the operator identification information that is transmitted at step S2901 is the terminal ID, and if the authentication is allowed, the authentication result that is transmitted from the authentication server 2301A includes, for example, information on the operator ID that corresponds to the terminal ID.

If the authentication result that is received from the authentication server 2301A is "NG" (denied), the authentication controller 2507 of the image forming apparatus 2300 interrupts execution of the advance authentication process for the terminal ID or for the operator ID for which the authentication is denied. Here, it is assumed that the authentication result is "OK" (allowed), and the following is described.

At step S2904, the image processing controller 2508 of the image forming apparatus 2300 transmits, to the print server 2301B, a job list information retrieval request for requesting to obtain the job list information of the operator whose authentication is allowed. The job list information retrieval request includes, for example, the operator ID (the operator identification information) that is determined at step S2705 of FIG. 27A, or the operator ID that is obtained from the authentication result that is received at step S2903.

At step S2905, the print server 2301B creates job list information that is a list of the jobs that are stored, while associated with the operator ID included in the job list information retrieval request that is received from the image forming apparatus 2300.

At step S2906, the print server 2301B transmits the job list information that is created at step S2905 to the image forming apparatus 2300, which is the request source.

At step S2907, the image processing controller 2508 of the image forming apparatus 2300 stores the job list information that is received from the print server 2301B, for example, in the storage unit 2314 of FIG. 24, while associating the job list information with the operator ID.

The image forming apparatus 2300 executes, for each user of the terminal 102 that is in the vicinity 2304 of the image forming apparatus 2300, the above-described process of step S2901 to step S2907, as the advance authentication process, for example.

In this manner, upon identifying, at step S2908, the operator of the image forming apparatus 2300 by the process of identifying the operator that is shown in FIG. 29, the image forming apparatus 2300 can allow the operator to log in to the image forming apparatus 2300, and the image forming apparatus 2300 can display an operation screen, without waiting for the process from step S2901 to step S2907.

For example, at step S2909, the authentication controller 2507 of the image forming apparatus 2300 allows the operator of the image forming apparatus 2300, who is identified at step S2908, to log in to the image forming apparatus 2300, based on the authentication result (OK) that is obtained at step S2903.

Further, at step S2910, the image processing controller 250 and the display input unit 2510 of the image forming apparatus 2300 displays an operation screen, such as a list of the jobs of the operator who is allowed to log in to the image forming apparatus 2300, by using the job list information that is stored at step S2907.

As described above, the image forming apparatus 2300 according to the embodiment determines, upon detecting that the strength of the radio wave received from the information terminal 102 is greater than or equal to the predetermined second radio wave strength, that the user of the information terminal 102 is in the vicinity of the image forming apparatus 2300, and the image forming apparatus 2300 executes the above-described advance authentication process.

In addition, upon detecting that the strength of the radio wave received from the information terminal 102 is greater than or equal to the predetermined first radio wave strength, the image forming apparatus 2300 determines that the user holding the information terminal 102 is the operator of the image forming apparatus 2300, and the image forming apparatus 2300 allows the operator to use the image forming apparatus 2300.

Thus, in the image forming apparatus 2300 according to the embodiment that can execute a process based on an instruction that is received from an operator, it is facilitated to identify the user who inputs the instruction to the image forming apparatus 2300, and to execute the process corresponding to the identified user.

According to the embodiments of the present invention, in an information processing device that can execute a process based on a command received from an operator, a process of identifying a user who inputs a command to the information processing device and execution of a process corresponding to the identified user can be facilitated.

Note that, according to the above-described embodiments, the following information processing device can be provided. Namely, the information processing device is configured to execute a process based on a command received from an operator. The information processing device includes a receiver configured to receive radio waves output from one or more mobile terminals; a retrieval unit configured to retrieve, from each of the radio waves received by the receiver, identification information including one of an operator identification information item for identifying the operator carrying the mobile terminal that outputs the radio wave and a terminal identification information item for identifying the mobile terminal that outputs the radio wave, wherein upon detecting that the identification information includes the operator identification information, the retrieval unit is configured to retrieve the operator identification information, and wherein upon detecting that the identification information includes the terminal identification information item, the retrieval unit is configured to retrieve the operator identification item by referring to a table stored in the information processing device, the table being configured to define a correspondence between the operator identification information item and the terminal identification information item; a measurement unit configured to measure a radio wave strength level of each of the radio waves received by the receiver; a first storage unit configured to store, for each operator identification information item retrieved by the retrieval unit, the radio wave strength level measured by the measurement unit; an identifying unit configured to identify, based on the radio wave strength levels stored for the corresponding operator identification information items, the operator identification information item output by the mobile terminal carried by the operator who inputs the command to the information processing device; and a controller configured to control execution of the process requested by the operator identified by the identified operator identification information item.

The information processing device, the information processing system and the non-transitory storage medium storing the program for executing a process based on a command received from an operator, and for facilitating a process of identifying the operator who inputs the command, and execution of a process corresponding to the identified operator are described above by the embodiments. However, the present invention is not limited to the embodiments, and various modifications and improvements may be made within the scope of the present invention. For example, the output terminal identification information may include the operator identification information. Alternatively, the output terminal identification may be the operator identification information. Specific examples of numerical values are used in order to facilitate understanding of the invention. However, these numerical values are simply illustrative, and any other appropriate values may be used, except as indicated otherwise. The separations of the items in the above-described explanation are not essential to the present invention. Depending on necessity, subject matter described in two or more items may be combined and used, and subject matter described in an item may be applied to subject matter described in another item (provided that they do not contradict). A boundary of a functional unit or a processing unit in a functional block does not necessarily correspond to a boundary of a physical component. An operation by a plurality of functional units may be physically executed by a single component. Alternatively, an operation by a single functional unit may be physically executed by a plurality of components. For the convenience of explanation, the devices according to the embodiment of the present invention are explained by using the functional block diagrams. However, these devices may be implemented in hardware, software, or combinations thereof. The software that operates in accordance with the present invention may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like.

The present invention can be implemented in any convenient form, for example using dedicated hardware, or a mixture of dedicated hardware and software. The present invention may be implemented as computer software implemented by one or more network processing apparatuses. The network can comprise any conventional terrestrial or wireless communications network, such as the Internet. The processing apparatuses can compromise any suitable programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device. The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2015-039047 filed on Feb. 27, 2015, and Japanese Patent Application No. 2016-014117 filed on Jan. 28, 2016, the entire contents of which are hereby incorporated by reference.

What is claimed is:

1. An information processing device configured to execute a process based on a user operation input by an operator, the information processing device comprising:
    a receiver configured to receive radio waves output from a plurality of mobile terminals; and
    processing circuitry configured to
        retrieve a plurality of identification information, each identification information of the plurality of identification information being from a different radio wave of the radio waves received by the receiver, and each identification information of the plurality of identification information for identifying an operator carrying a mobile terminal, of the plurality of mobile terminals, that outputs a corresponding radio wave;
        receive an instruction at a position on an input surface from the operator carrying the mobile terminal;
        control a display to display an indication of the instruction;
        measure a radio wave strength level of each of the radio waves received by the receiver;
        identify, based on the radio wave strength levels of the radio waves corresponding to the received identification information a time interval during which the identification information is received, specific identification information of the plurality of identified information for determining the operator that inputs the instruction to the input surface;
        control execution of the process corresponding to the operator, identified by the specific identification information, that inputs the instruction to the input surface; and
        control the display to display a display screen of the operator identified by the specific identification information.

2. The information processing device according to claim 1, wherein the processing circuitry is configured to determine, among the radio wave strength levels stored for the corresponding identification information, that the specific identification information, for which the radio wave strength level is greater than the radio wave strength levels of the identification information other than the specific identification information, is output by the mobile terminal carried by the operator that inputs the instruction to the input surface.

3. The information processing device according to claim 1, wherein the processing circuitry is configured to:
    store, upon detecting that the operator carrying the mobile terminal inputs the instruction to the input surface, a first radio wave strength level that indicates the measured radio wave strength level, while associating the first radio wave strength level with the identification information, and determine, upon detecting that, among the radio wave strength levels stored for the corresponding identification information, the radio wave strength level of the specific identification information reaches the first radio wave strength level corresponding to the specific identification information, that the specific identification information is output by the mobile terminal carried by the operator that inputs the instruction to the input surface.

4. The information processing device according to claim 3, wherein the processing circuitry is configured to store, upon detecting that the operator carrying the mobile terminal is within a predetermined range from the information processing device, a second radio wave strength level that indicates the measured radio wave strength level, while associating the second radio wave strength level with the identification information, and start executing at least a part of an authentication process for using the information processing device, based on at least one of the identification information such that the radio wave strength level that is stored for the identification information reaches the second radio wave strength level corresponding to the identification information.

5. The information processing device according to claim 4, wherein the processing circuitry is configured to start executing at least a part of the process corresponding to the operator that is identified by the identification information, based on the at least one of the identification information such that the radio wave strength level that is stored for the identification information reaches the second radio wave strength level corresponding to the identification information.

6. The information processing device according to claim 3, wherein the process corresponding to the operator that is identified by the identification information is an image forming process.

7. The information processing device according to claim 1, further comprising:

a detector configured to detect the position of the instruction on the input surface, the instruction being received from the operator, wherein the processing circuitry is configured to store the identified identification information, and instruction position information indicating the position of the instruction detected by the detector, while associating the identification information with the instruction position information, and control the display to display the indication of the instruction corresponding to the instruction position information, so that the operator that inputs the instruction is identified based on the identification information that is associated with the stored instruction position information.

8. The information processing device according to claim 7, further comprising:

one or more cameras configured to capture an image of the operator that inputs the instruction at the position on the input surface, wherein the processing circuitry is configured to identify the operator that inputs the instruction on the input surface by using the position of the instruction on the input surface and the captured image.

9. The information processing device according to claim 7, wherein the processing circuitry is configured to identify the identification information that is output by the mobile terminal carried by the operator that inputs the instruction on the input surface, depending on a variation of the measured radio wave strength level.

10. An information processing device configured to receive an instruction at a position on an input surface from a plurality of operators holding corresponding mobile terminals, and configured to display an indication of the instruction, the information processing device comprising:

a detector configured to detect the position of the instruction on the input surface, the instruction being received from an operator;

a receiver configured to receive radio waves output from the mobile terminals held by the plurality of operators;

processing circuitry configured to retrieve, from each of the radio waves received by the receiver, output terminal identification information for identifying a mobile terminal that outputs a radio wave;

measure a strength level of each of the radio waves received by the receiver;

identify, based on the strength levels of the measured radio waves and the output terminal identification information, specific output terminal identification information of the radio wave for determining the operator that inputs the instruction for which the position is detected by the detector; and store the identification information that is associated with the specific output terminal identification information, the identification information being associated with the output terminal identification information, and the instruction position information indicating the position of the instruction detected by the detector, while associating the identification information with the instruction position information; and a display configured to display the indication of the instruction corresponding to the instruction position information, so that the operator who inputs the instruction is identified based on the identification information that is associated with the instruction position information, wherein the processing circuitry identifies the specific output terminal identification information based on, among the strength levels of the measured radio waves, the strength level of a measured radio wave corresponding to a time interval during which the instruction at the position on the input surface is received.

11. The information processing device according to claim 10, wherein the processing circuitry is configured to determine that the output terminal identification information of the mobile terminal with a greatest radio wave strength level corresponding to the time interval during which the instruction at the position on the input surface is received is the specific output terminal identification information.

12. The information processing device according to claim 10, wherein the processing circuitry is configured to store a maximum value of the strength levels of the radio waves output from the corresponding mobile terminals, and determine, upon detecting that there is the mobile terminal for which the strength level is measured, the strength level corresponding to the time interval during which the instruction at the position on the input surface is received, matches the maximum value of the strength level of the radio wave, that the output terminal identification information of the mobile terminal is the output terminal identification information of the mobile terminal held by the operator who inputs the instruction at the position on the input surface that is detected by the detector.

13. The information processing device according to claim 10, further comprising:
one or more cameras configured to capture an image of the operator that inputs the instruction at the position on the input surface, wherein
the processing circuitry is configured to identify the operator that inputs the instruction on the input surface by using the position of the instruction on the input surface and the captured image.

14. The information processing device according to claim 10, wherein the processing circuitry is configured to identify the output terminal identification information of the mobile terminal held by the operator that inputs the instruction on the input surface, depending on a variation of the measured radio wave strength level.

15. The information processing device according to claim 10, wherein each of the mobile terminals held by the plurality of operators is configured to output the radio wave based on a short range radio communication standard.

16. An information processing system configured to execute a process, the information processing system comprising:
a receiver configured to receive radio waves output from one or more mobile terminals; and
processing circuitry configured to
retrieve a plurality of identification information, each identification information of the plurality of identification information from a different radio wave of the radio waves received by the receiver, and each identification information of the plurality of identification information for identifying an operator carrying a mobile terminal, of the plurality of mobile terminals, that outputs a corresponding radio wave;
receive an instruction at a position on an input surface from the operator carrying the mobile terminal;
control a display to display an indication of the instruction;
measure a radio wave strength level of each of the radio waves received by the receiver;
identify, based on the radio wave strength levels of the radio waves corresponding to the retrieved identification information a time interval during which the identification information is retrieved, specific identification information of the plurality of identification information for determining the operator that inputs the instruction to the input surface;
control execution of the process corresponding to the operator, identified by the specific identification information, that inputs the instruction to the input surface; and
control the display to display a display screen of the operator identified by the specific identification information.

* * * * *